United States Patent [19]
Iwai et al.

[11] Patent Number: 6,070,019
[45] Date of Patent: May 30, 2000

[54] CAMERA CAPABLE OF READING/WRITING INFORMATION OF PHOTO FILM CASSETTE

[75] Inventors: Fumio Iwai; Kiyotaka Kobayashi; Yutaka Yoshida, all of Saitama, Japan

[73] Assignees: Fuji Photo Film Co., Ltd., Kanagawa; Fuji Photo Optical Co., Ltd., Saitama, both of Japan

[21] Appl. No.: 09/141,330

[22] Filed: Aug. 27, 1998

Related U.S. Application Data

[62] Division of application No. 08/791,148, Jan. 30, 1997, Pat. No. 5,893,000.

[30] Foreign Application Priority Data

Jan. 31, 1996 [JP] Japan ........................................ 8-16167
Jan. 31, 1996 [JP] Japan ........................................ 8-16174
Jan. 31, 1996 [JP] Japan ........................................ 8-16175

[51] Int. Cl.$^7$ ............................ G03B 17/18; G03B 17/24
[52] U.S. Cl. ............................ 396/292; 396/310; 396/319
[58] Field of Search ................................. 396/310, 319, 396/320, 311, 312, 313, 314, 315, 316, 317, 318, 321, 292

[56] References Cited

U.S. PATENT DOCUMENTS

| | | | |
|---|---|---|---|
| 4,978,985 | 12/1990 | Smart et al. | 396/515 |
| 5,130,745 | 7/1992 | Cloutier et al. | 355/40 |
| 5,541,681 | 7/1996 | Cocca et al. | 396/389 |
| 5,565,935 | 10/1996 | Miura et al. | 396/310 |
| 5,612,760 | 3/1993 | Okuno | 396/513 |
| 5,625,855 | 4/1997 | Takatori | 396/513 |
| 5,983,035 | 11/1999 | Funaki | 396/310 X |

*Primary Examiner*—W. B. Perkey
*Attorney, Agent, or Firm*—Sughrue, Mion, Zinn, Macpeak & Seas, PLLC

[57] ABSTRACT

A camera is used with a photo film cassette of a predetermined type. The photo film cassette includes a spool about which photo film is wound. A cassette shell contains the spool in a rotatable manner. A data disk with a bar code is disposed on the spool in a manner readable externally outside the cassette shell for signaling photo film information. In the camera, a cassette containing chamber contains the cassette. A bottom lid closes the cassette containing chamber in an openable manner. A spool drive shaft rotates the spool of the cassette in the cassette containing chamber, the spool drive shaft being connected to the spool set at a first rotational angle when the spool drive shaft has the first rotational angle. An bar code reader reads the photo film information from the data disk rotated in the cassette containing camber. A type determiner section in CPU detects whether the photo film cassette of the predetermined type is loaded in the cassette containing chamber according to the photo film information from the bar code reader. CPU controls operation of the spool drive shaft, CPU rotating the spool drive shaft when the bottom lid is closed, CPU stopping the spool drive shaft to set the spool at a second rotational angle when the type determiner section detects lack of the cassette or existence of a cassette different from the predetermined type.

8 Claims, 34 Drawing Sheets

F I G. 3
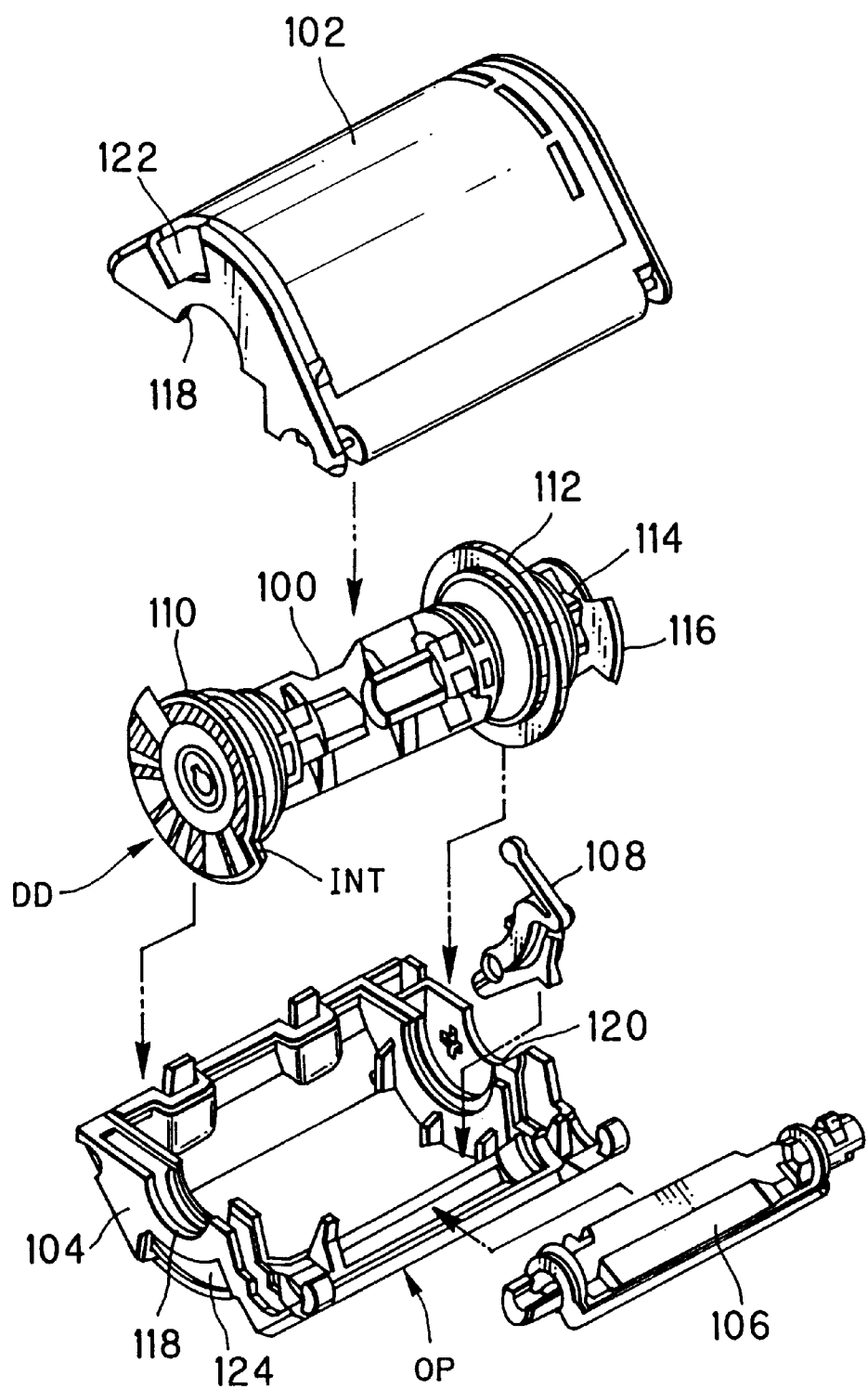

F I G. 10A
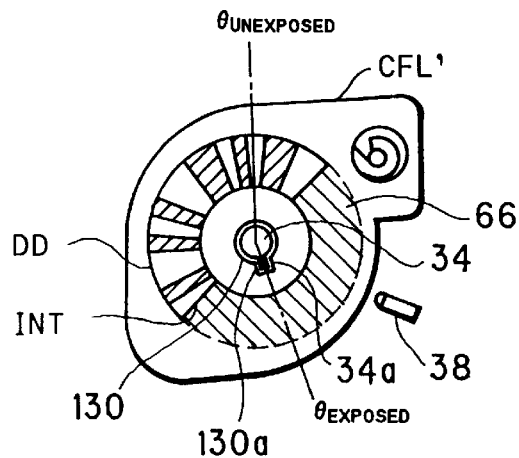
F I G. 10B
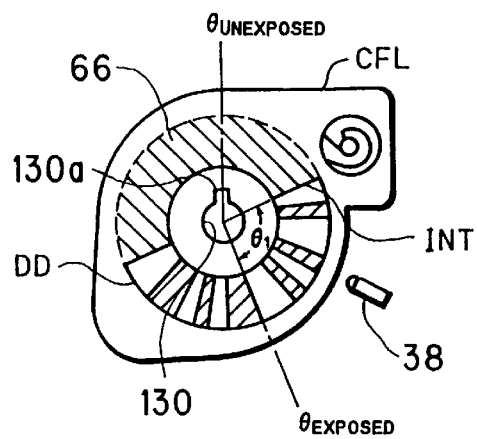
F I G. 10C
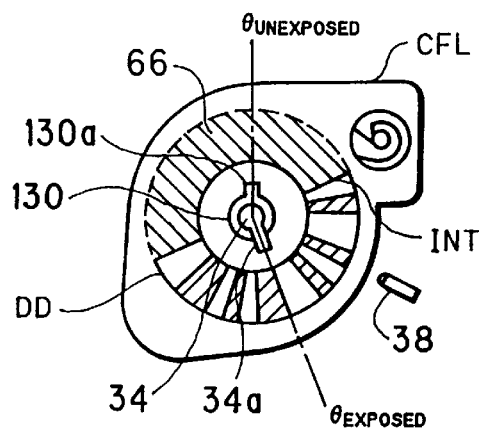

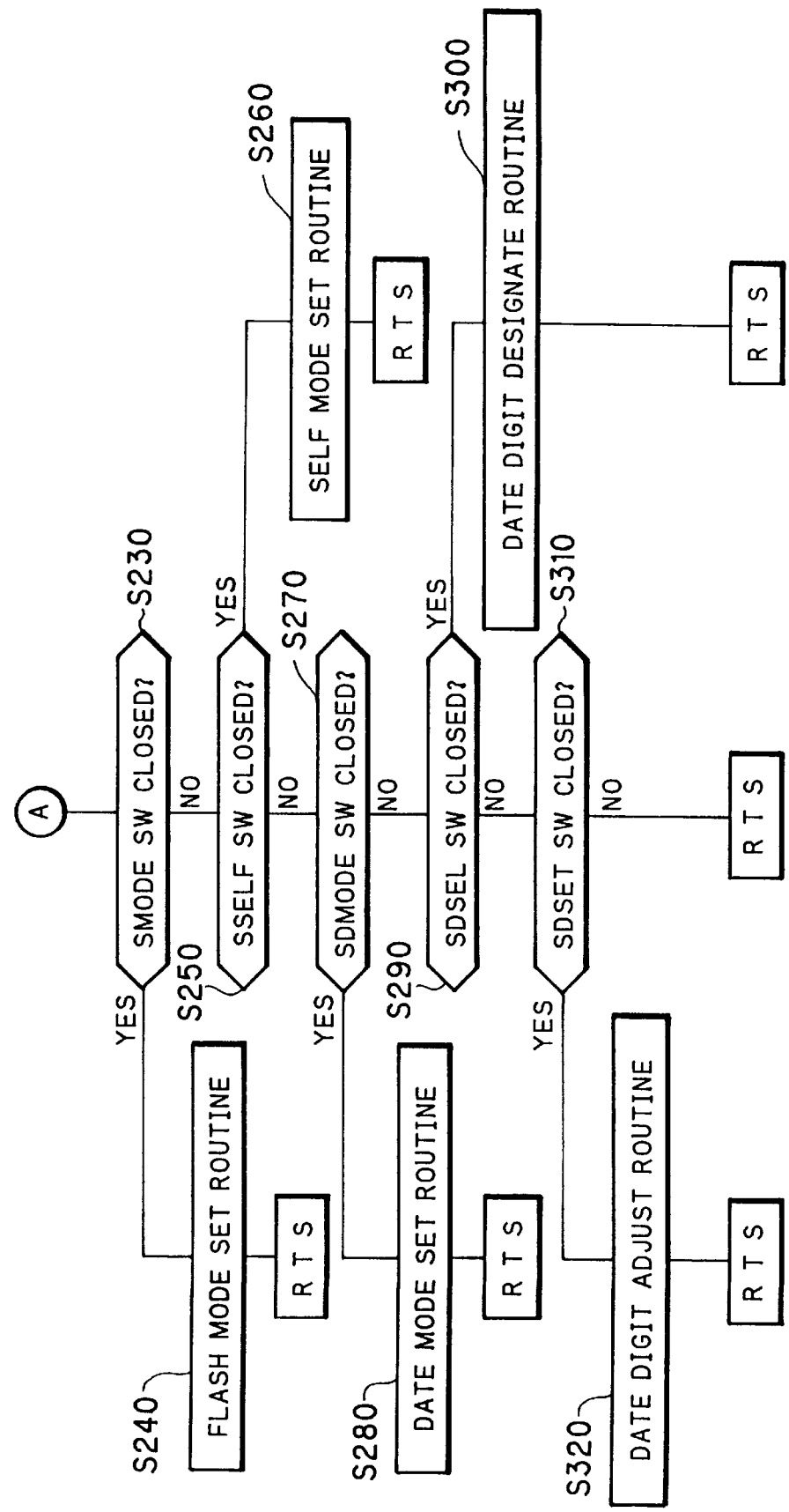

F I G. 26
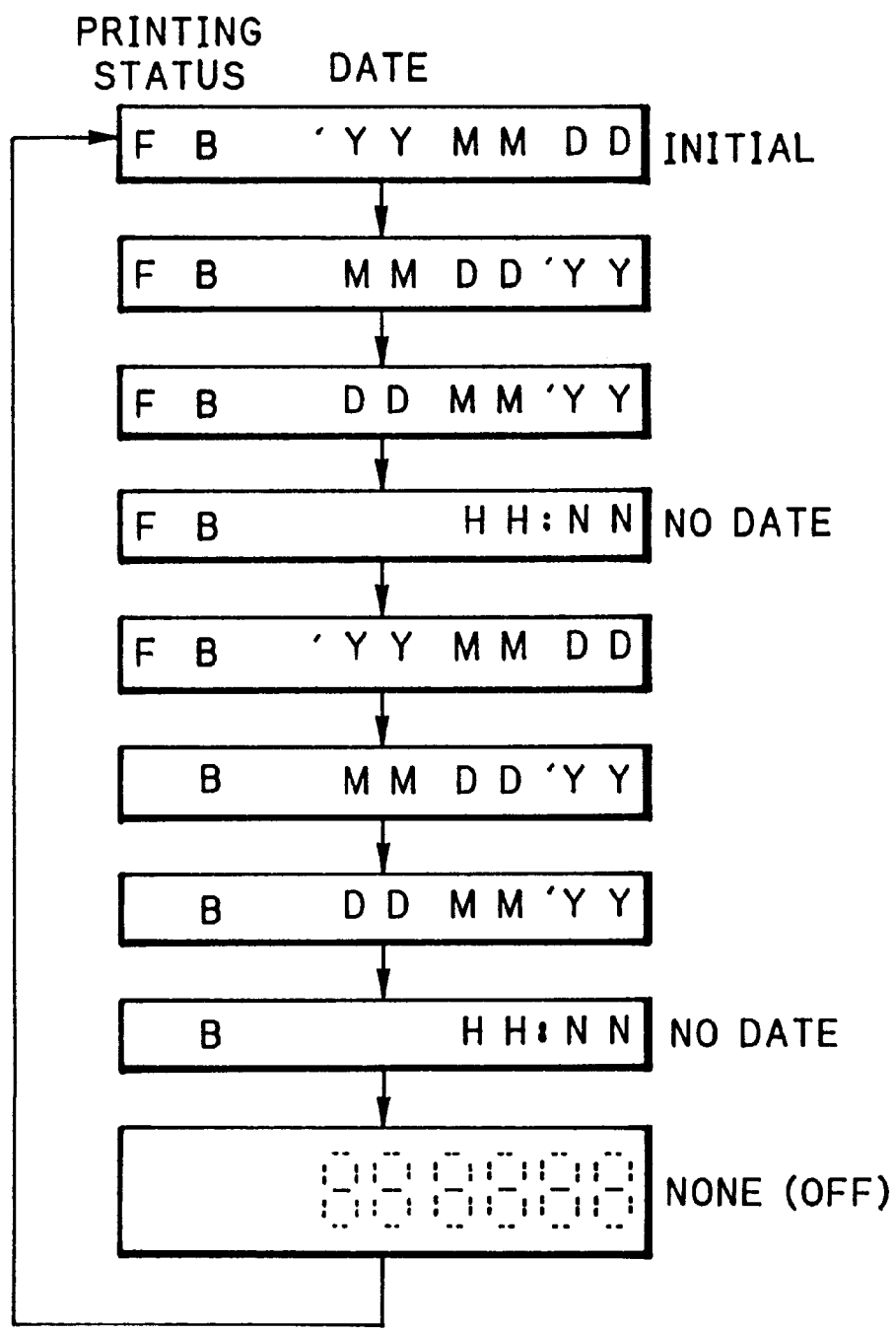

FIG. 28
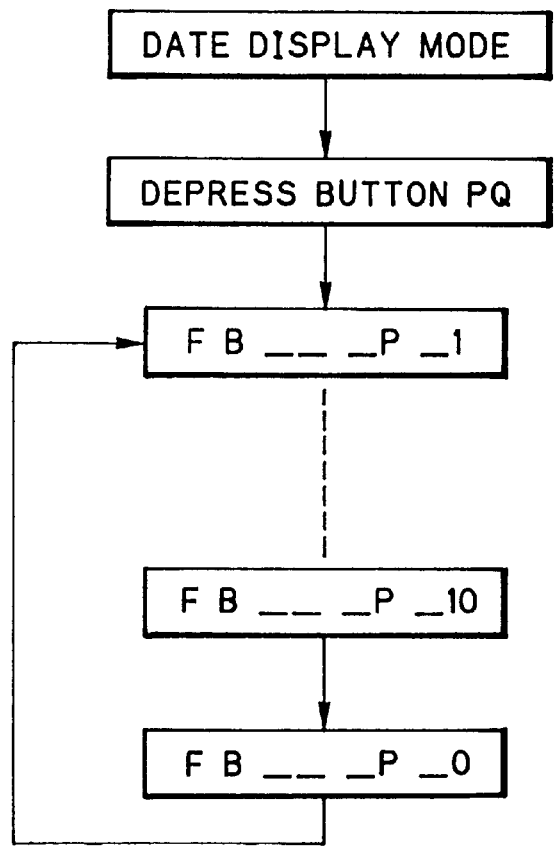
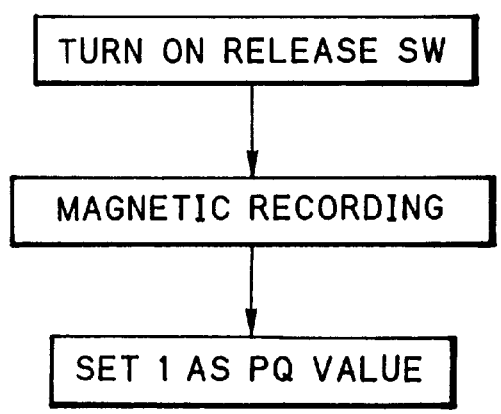

FIG. 31

ST SELECT MODE: DEFINITION OF LANGUAGES

| CODES | LANGUAGES |
|---|---|
| 01 | DANISH |
| 02 | FINNISH |
| 03 | FRENCH |
| 04 | GERMAN |
| 05 | ITALIAN |
| 06 | JAPANESE 1 ALPHABETIZED |
| 07 | JAPANESE 2 KATAKANA LETTERS |
| 08 | NORWEGIAN |
| 09 | PORTUGUESE |
| 10 | SPANISH |
| 11 | SWEDISH |
| 12 | U.K. ENGLISH |
| 13 | U.S. ENGLISH |
| 14-99 | (REGIONS FOR EXTENSION) |

FIG. 32

GLOBAL CAPTIONS (TITLES)

| CODES | CAPTIONS (TITLES) |
|---|---|
| 00 | CHRISTMAS |
| 01 | BIRTHDAY |
| 02 | VACATION |
| 03 | HONEYMOON |
| 04 | MARRIAGE |
| 05 | (UNDEFINED) |
| 06 | GRADUATION CEREMONY |
| 07 | FAMILY |
| 08 | PARTY |
| 09 | HOLIDAY |
| 10 | ANNIVERSARY |
| 11 | FRIENDSHIP |
| 12 | SCHOOL EVENT |
| 13 | (UNDEFINED) |
| 14 | I LOVE YOU |
| 15 | THANKS |
| 16 | (UNDEFINED) |
| 17 | HAPPY BIRTHDAY |
| 18 | CONGRATULATIONS |
| 19 | MERRY CHRISTMAS |
| 20 | FESTIVAL |
| 21 | ENTRANCE CEREMONY |
| 22 | ON TOUR |
| 23 | NEW YEAR |
| 24 | EASTER |
| 25 | A HAPPY NEW YEAR |
| 26 | REUNION OF SCHOOLMATES |
| 27 | FATHER'S DAY |
| 28 | MOTHER'S DAY |
| 29 | REMINISCENCE |
| 30 | BAPTISM |
| 31-49 | (REGIONS FOR EXTENSION) |

CAMERA CAPABLE OF READING/WRITING INFORMATION OF PHOTO FILM CASSETTE

This is a divisional of application Ser. No. 08/791,148 filed Jan. 30, 1997, now U.S. Pat. No. 5,893,000 the disclosure of which is incorporated herein by reference.

BACKGROUND OF THE INVENTION

1. Field of the Invention

The present invention relates to a camera capable of reading/writing information of a photo film cassette. More particularly, the present invention relates to a camera capable of reliably detecting existence of a photo film cassette by utilizing reading of information of the photo film cassette.

2. Description Related to the Prior Art

A photo film cassette of a widely used 35 mm type includes a spool rotatably contained in a cassette shell, and a silver salt photo film wound about the spool in a roll form and contained in the cassette shell. Outside the cassette shell, there are a bar code printed to represent information including photo film speed, and numerals or signs printed to indicate the maximum number of available frames of the photo film. A photo film passage port or slit is formed along the cassette shell, and adapted to passage of the photo film for unwinding and winding back. In the 35 mm type, a DX code is used to represent the information.

After development of the photo film, the cassette shell of the 35 mm photo film cassette is discarded as a waste. The photo film is cut into pieces each of which includes a predetermined number of frames. Those photo film pieces are inserted into a sheet holder or photo film sheaths. The photo film being developed is handled by a photofinisher to produce photographic prints or photographs by exposing photographic paper with frames recorded on the photo film.

There is also a new standardized photo film cassette known as IX240 type, which includes the photo film, the spool and the cassette shell being plastic. The cassette shell has a photo film port shutter or cassette shutter disposed in a rotatable manner between open and closed positions in a photo film passage port. When the spool is rotated in a direction to unwind the photo film, a leader of the photo film is advanced from the inside to the outside of the cassette shell through the passage port being open.

The spool further includes a data disk and a status indicator mechanism, both of which are rotatable integrally with a core of the spool, and are visible through openings or holes formed in the cassette shell of the new standardized photo film cassette.

On the data disk is disposed a rotary bar code, which represents photo film information including photo film speed or ISO sensitivity, the maximum number of available frames of the photo film, and a photo film type. When a camera is loaded with the new standardized photo film cassette, a photo sensor automatically reads the data disk to recognize the information. The indicator mechanism includes four indicia holes and an indicator tongue. An end face of the cassette shell has the four indicia holes formed through it in different shapes. The four indicia holes represent an unexposed status, an exposed status, a developed status, and a partially exposed status. The indicator tongue is disposed fixedly with an end of the spool, and stopped behind one of the indicia holes, to indicate one of four statuses of the photo film.

The user is enabled to use the new standardized photo film cassette with the camera to take photographs in such a convenient manner as the 35 mm photo film cassette. The new standardized photo film cassette has an additional feature of containing the roll of the photo film after development for preservation. The cassette shell of the new standardized photo film cassette can be effective when the new standardized photo film cassette is loaded in various external optical instruments. Visible images of the photo film being developed can be electrically reproduced on a monitor display or printed on a sheet. The new standardized photo film cassette is useful as a container for the recording medium by the virtue of its compatibility to an audio-visual system.

The new standardized photo film cassette being standardized newly is different in the structure and operation from the 35 mm photo film cassette. Even if a user erroneously loads the newly standardized camera with the 35 mm photo film cassette, the 35 mm photo film cassette is automatically treated in the camera without recognizing the error, to damage both the 35 mm photo film cassette and the camera. Even after the erroneously inserted cassette is unloaded from the camera, an accidental operation is likely to occur when the new standardized photo film cassette is acceptably inserted in the camera.

SUMMARY OF THE INVENTION

In view of the foregoing problems, an object of the present invention is to provide a camera capable of reliably detecting existence of a wrong type of photo film cassette to avoid damaging the camera and cassettes.

Another object of the present invention is to provide a camera having a reduced number of external operable input units, such as pushbuttons, for adjustment.

In order to achieve the above and other objects and advantages of this invention, a data disk is disposed on the spool in a manner readable externally outside the cassette shell for signaling photo film information. In the camera, a cassette containing chamber contains the cassette. A lid closes the cassette containing chamber in an openable manner. A spool drive mechanism rotates the spool of the cassette in the cassette containing chamber, the spool drive mechanism being connected to the spool set at a first rotational angle when the spool drive mechanism has the first rotational angle. An information reader reads the photo film information from the data disk rotated in the cassette containing camber. Type determiner means detects whether the photo film cassette of the predetermined type is loaded in the cassette containing chamber according to the photo film information from the information reader. A controller controls operation of the spool drive mechanism, the controller rotating the spool drive mechanism when the lid is closed, the controller stopping the spool drive mechanism to set the spool at a second rotational angle when the type determiner means detects lack of the cassette or existence of a cassette different from the predetermined type.

In a preferred embodiment, a status indicator is disposed on one end of the cassette shell in an externally observable manner, for indicating a used status of the photo film, the status indicator indicating an unexposed status of the photo film when the spool has the first rotational angle, and indicating an exposed status of the photo film when the spool has the second rotational angle.

Furthermore the camera has a magnetic head, the magnetic head recording information of a printing number of photographic prints to a magnetic layer of photo film in association with a frame exposed on the photo film. There is an externally observable display device. A first input unit is externally operable for generating a first signal. A second input unit is externally operable for generating a second signal. A third input unit is externally operable for generating a third signal. The controller means selectively executes a date display mode, a date adjust mode and a print number mode, the date display mode being adapted to indicate a date in the display device, the date adjust mode being adapted to adjusting the date in the display device, and the print number mode being adapted to indicate the printing number, the date adjust mode being selected when the first signal is generated in the date display mode, and the print number mode being selected when either of the second and third signals is generated in the date display mode.

When the second signal is generated in the date adjust mode, the controller means locally designates one of plural numerals arranged in the display device to be adjusted. When the third signal is generated, the controller means changes the locally designated one of the numerals.

When the either signal of the second and third signals is generated in the print number mode, the controller means changes the printing number.

BRIEF DESCRIPTION OF THE DRAWINGS

The above objects and advantages of the present invention will become more apparent from the following detailed description when read in connection with the accompanying drawings, in which:

FIG. 3 is an exploded perspective illustrating a photo film cassette;

FIGS. 10A–10C are explanatory views in plans, illustrating rotational positions of the data disk and the spool drive shaft;

FIGS. 11A and 11B are flow charts illustrating a main routine of operation of the camera;

FIG. 26 is a chart illustrating examples of the date selectable in a looped routine;

FIG. 28 is a chart illustrating a routine where a PQ number mode is started and ended;

FIG. 31 is a table illustrating selectable languages with language codes;

FIG. 32 is a table illustrating selectable captions with caption codes;

DETAILED DESCRIPTION OF THE PREFERRED EMBODIMENT(S) OF THE PRESENT INVENTION

The present invention is described with reference to the drawings. FIGS. 1, 2A, 2B and 9A–9F illustrate a camera. FIGS. 3, 4A, 4B, 5, 6, 7, 8, 8A and 10A–10C illustrate a photo film cassette of the IX240 type. FIGS. 11A–19 are flow charts and a timing chart of the operation of the camera.

Figure 1:
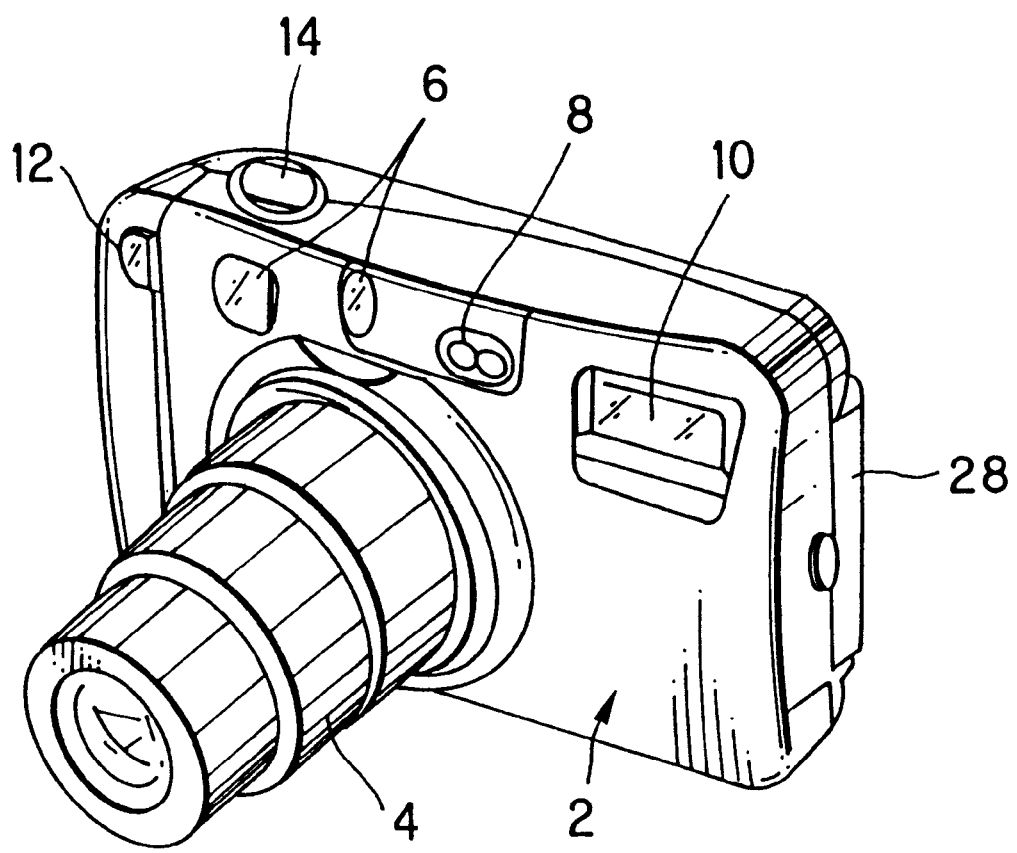
FIG. 1 is a perspective illustrating a camera.

In FIG. 1, a front of a camera 2 has a lens barrel 4, sensor windows 6, a viewfinder window 8, a flash emitting window 10 and a lamp or light-emitting diode (LED) 12. The lens barrel 4 has a zoom lens of which a focal length is variable. The sensor windows 6 respectively have an auto focussing sensor and an exposure sensor. The lamp 12 is turned on to indicate a use of a self timer. A top of the camera 2 has a shutter release button 14 for a shutter device 14a (See FIG. 34) and associated with an SP1 switch.

Figure 2A:
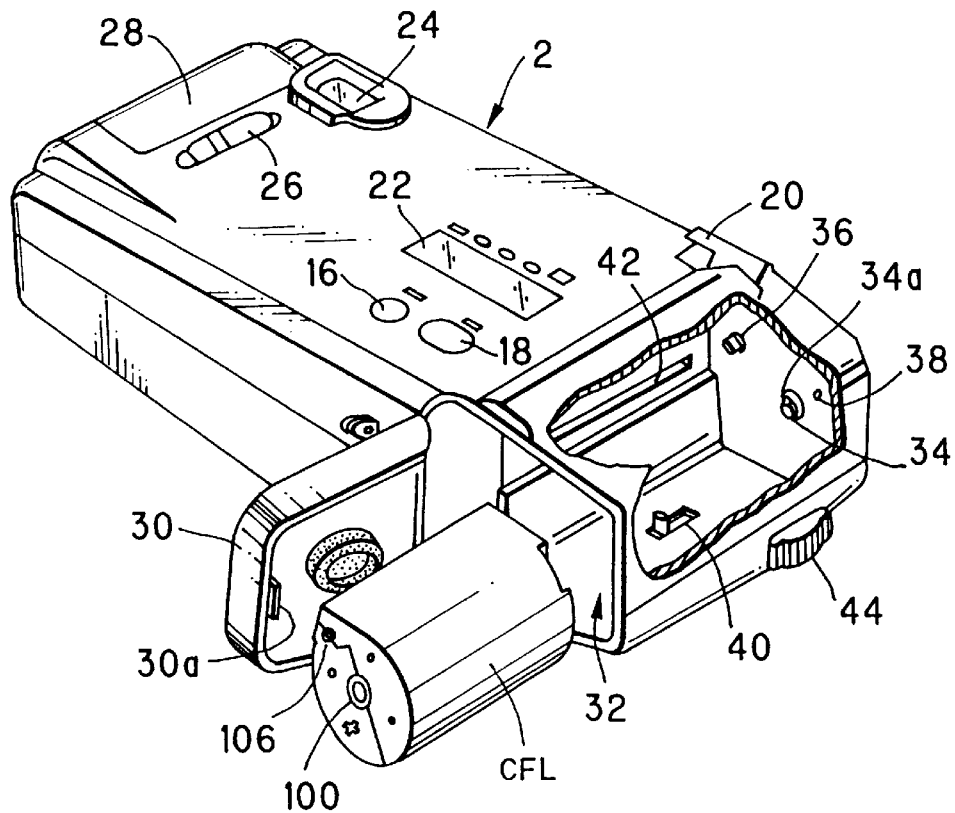
FIG. 2A is a perspective, partially broken, illustrating the camera in which a cassette containing chamber is opened.

In FIG. 2A, a rear of the camera 2 has an SM switch or main switch 16, an SMODE switch 18, a zoom lever 20, a liquid crystal display (LCD) panel 22, a viewfinder eyepiece 24, a frame size lever 26 and a button cover 28. The frame size lever 26 is operable for selectively setting one of two frame sizes. The button cover 28 has a group of various switches for inputting commands as a switch group 202 depicted in FIG. 34, for example to adjust indication of the LCD panel 22.

A bottom of the camera 2 has an openable lid 30, which is swung open to load and unload a photo film cassette CFL. An SCC switch is disposed to detect opening/closing movement of the lid 30, and is included in the switch group 202.

Inside the camera 2 is formed a cassette containing chamber 32, which is generally cylindrical and enclosed by closing the lid 30 in light-tight fashion. Inside the cassette containing chamber 32 are disposed a spool key or spool drive shaft 34, a shutter rotating shaft or key 36, a bar code reader 38 incorporating a photo sensor, an SCT switch 40 and a photo film gate 42. The spool drive shaft 34 is received in and fitted in an axial hole 130 (See FIGS. 4A and 4B) in a spool 100 of the photo film cassette CFL when the cassette CFL is inserted in the cassette containing chamber 32 in an axial direction. The shutter rotating shaft 36 is received in and fitted in an axial hole 132 in a photo film port shutter or cassette shutter 106. The bar code reader 38 reads information of a data disk DD optically. The SCT switch 40 is engaged on a top end of the cassette CFL, and moved thereby to detect insertion of the cassette CFL. The photo film gate 42 receives a photo film FLM thrust out of the cassette CFL toward an exposure aperture of the camera 2. The photo film cassette CFL is described later in detail.

Figure 36:
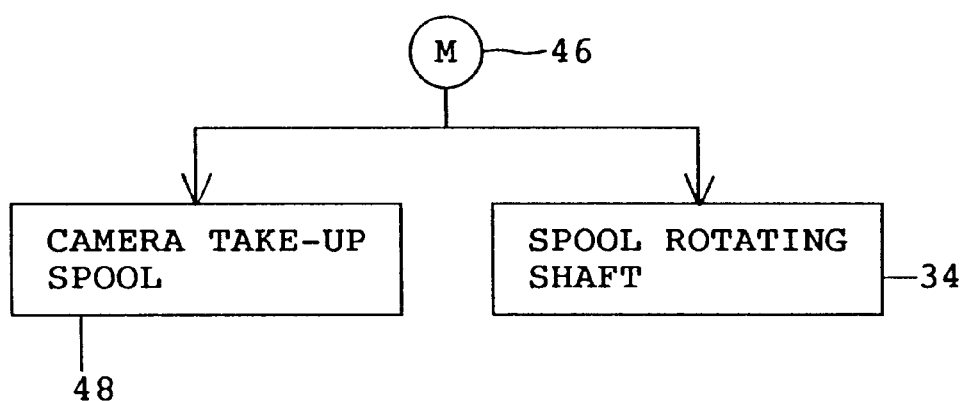
FIG. 36 is a block diagram schematically illustrating a photo film feeding mechanism.

The spool drive shaft 34 has a key shape, and has a projection 34a disposed on a shaft portion and projecting radially in a rectangular shape. The spool drive shaft 34 is supported in a slidable manner vertically within a limited stroke in response to upward pressure. The spool drive shaft 34 is connected to, and driven by, a feeding motor 46 of FIG. 36 in the camera 2. A rotational angle of the spool drive shaft 34 is detected by a photo interrupter (not shown) monitoring the number of generated pulses. It is determined that 508 pulses are generated per one rotation of the spool drive shaft 34. A tip of the shutter rotating shaft 36 has a shape of a minus-shaped tip of a screwdriver. In FIG. 36, the feeding motor 46 selectively drives the spool drive shaft 34 and also a take-up spool 48 disposed in a roll chamber opposite to the cassette containing chamber 32. Those are included in a photo film feeding mechanism 204 in FIG. 34.

A lid-opener button 44 is disposed on a side of the camera 2. When the lid-opener button 44 is slid along an L-shaped guide groove while the lid 30 is closed, an engaging claw 30a of the lid 30 is disengaged from an edge of the camera 2 to render the lid 30 openable. When the lid 30 being open is pushed in a closing direction, the engaging claw 30a is retained on the edge of the camera 2 to enclose the cassette containing chamber 32.

Figure 2B:
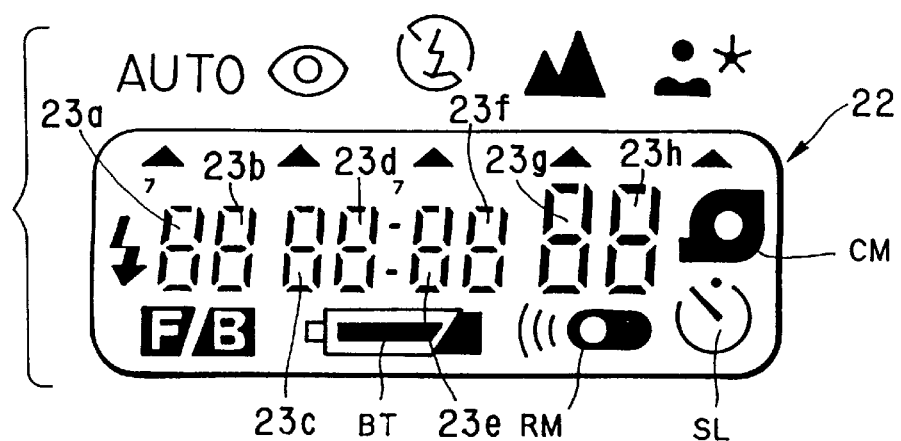
FIG. 2B is an explanatory view illustrating a liquid crystal display panel.

In FIG. 2B, the LCD panel 22 indicates various information. In a first row of the LCD panel 22, there are five triangular indicia for pointing respective ones of photograph-taking modes. The five mode indicia are printed on the rear of the camera 2. In a second row of the LCD panel 22, there are a cassette indicia CM, eight digits 23a–23h and a downward arrow indicia. The cassette indicia CM appears while the cassette CFL is loaded, and turned off when the cassette CFL is unloaded. The eight digits 23a–23h respectively have seven straight segments, which are arranged as sides of two quadrilaterals. The downward arrow indicia appears in a blinking manner while the flash device is being charged. In a third row of the LCD panel 22, there are a printing status sign "F/B", a battery indicia BT, a remote control indicia RM and a timer indicia SL. The printing status sign "F/B" appears to indicate the front printing and/or the back printing. The battery indicia BT indicates a remaining available amount of a battery contained in the camera 2. The remote control indicia RM appears when the camera 2 is operated according to the remote control. The timer indicia SL appears when an exposure is taken with the self timer.

Among the eight digits 23a–23h, the two digits 23g and 23h in FIG. 2B the nearest to the cassette indicia CM indicate the number of available frames, and are turned off when no available frames remain (the frame number is zero). After exposures are taken to the photo film FLM of the photo film cassette CFL, a sign "E" is indicated at the digits 23g and/or 23h.

The two digits 23a and 23b indicate a year in which a photograph is taken. The four digits 23c, 23d, 23e and 23f indicate a month, a day, and/or a time at which a photograph is taken. When the lid 30 is closed with the cassette CFL inserted, the digit 23a is driven to indicate a sign of a photo film type, indicates "P" for a reversal film, indicates "b" for a monochromatic film, is turned off for a color negative film, and indicates "o" for any other type of photo film. The four digits 23c–23f also indicate ISO sensitivity of the photo film. When the various switches inside the button cover 28 are operated, the date and time in the LCD panel 22 can be adjusted, and a designated one of captions or comments can be indicated in the eight digits 23a–23h.

Figure 34:
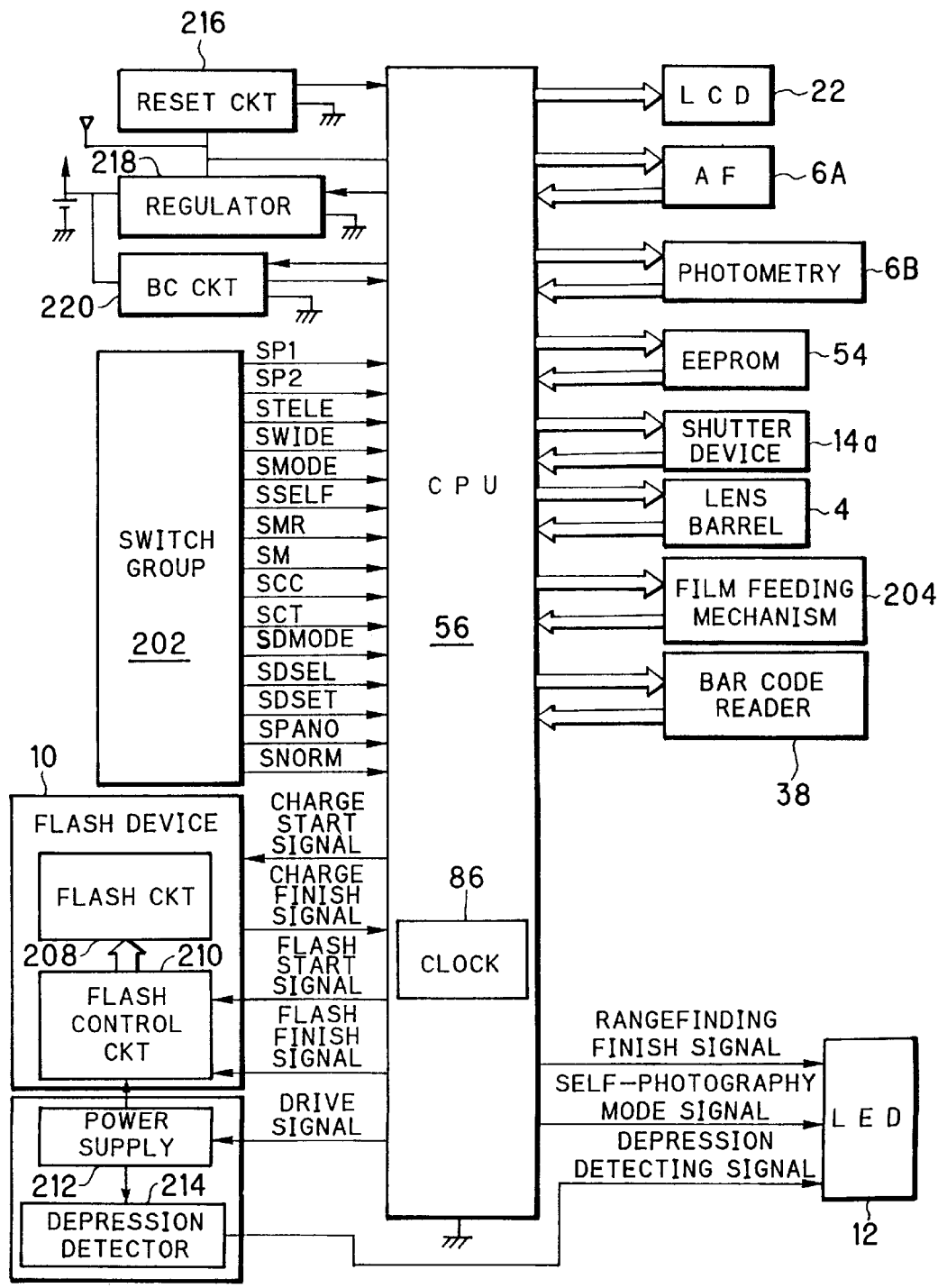
FIG. 34 is a block diagram schematically illustrating relevant circuits of the camera.

As depicted in FIG. 34, the camera 2 incorporates a microprocessor or CPU (central processing unit) 56 and an EEPROM (electrically erasable programmable read-only memory) 54 as a non-volatile semiconductor memory. CPU 56 executes previously determined control programs, and controls the photograph-taking operation, the adjusting operation of the switch group 202, and the indicating operation of the LCD panel 22. EEPROM 54 stores various data required by CPU 56 for the control.

Figure 35:
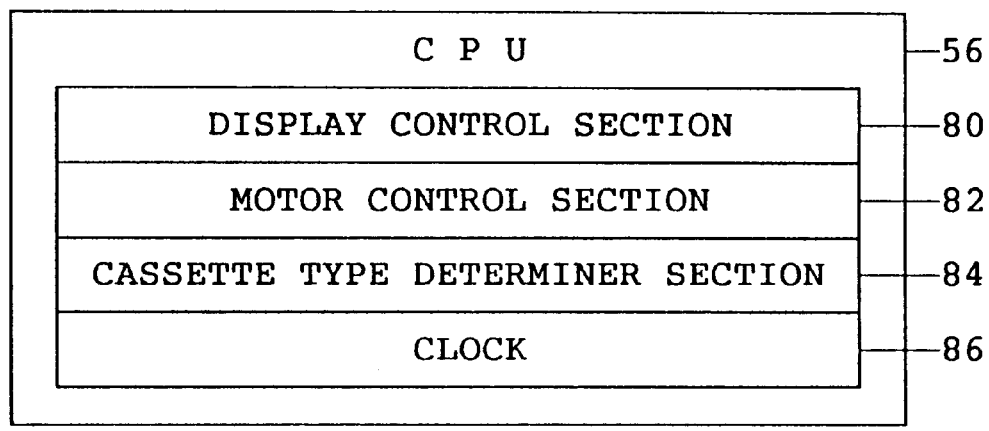
FIG. 35 is a block diagram schematically illustrating a detailed components included in CPU.

In FIG. 35, CPU 56 includes a display control section 80, a motor control section 82, a cassette type determiner section 84, and a clock 86.

Referring to FIGS. 3–7, the cassette CFL is hereinafter described. In FIG. 4A, the cassette CFL is viewed from the side of the data disk DD. In FIG. 4B, the cassette CFL is upside down, and viewed from the side of four indicia holes representing the photo film status.

In FIG. 3, the cassette CFL includes the spool 100, shell halves 102 and 104, the cassette shutter 106 and a lock member 108. The spool 100 has the silver salt photo film FLM (See FIG. 4A). The shell halves 102 and 104 are fitted together in a cylindrical shape to contain the spool 100. The cassette shutter 106 is contained in a photo film passage port or slot OP between the shell halves 102 and 104. The lock member 108 is shiftable to block and release rotation of the spool 100 in association with the cassette shutter 106.

The spool 100 has circular flanges 110 and 112 formed integrally therewith. The data disk DD having a rotary bar code is located near to an outer face of the flange 110. A gear portion 114 and a status indicator tongue 116 of white color are located near to an outer face of the flange 112. The gear portion 114 receives the lock member 108 and is retained in a locked state. The spool 100 is a single piece including all those portions: the flanges 110 and 112, the data disk DD, the gear portion 114 and the indicator tongue 116.

The data disk DD has a reference position INT as one edge where the bar code starts. Both the reference position INT and the indicator tongue 116 have each predetermined direction, so that an angle between them is previously recognized.

Figure 4A:
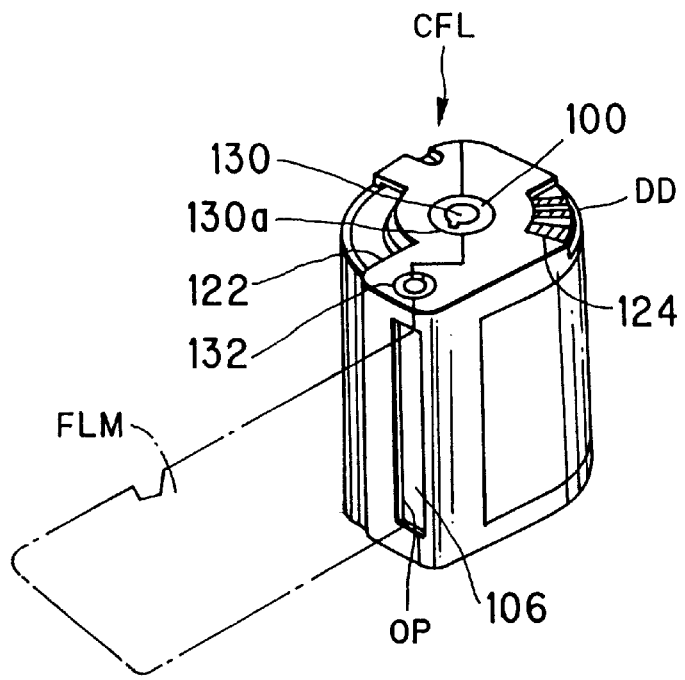
FIG. 4A is a perspective illustrating the cassette of which four indicia holes are oriented upwards.
Figure 7:
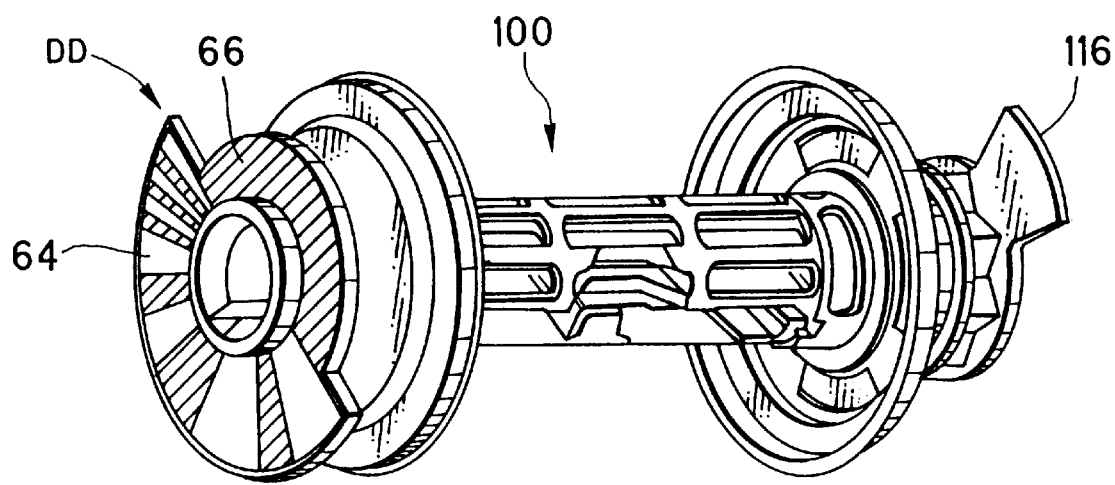
FIG. 7 is a perspective illustrating a spool of the cassette.

In FIGS. 4A and 7, the rotary bar code of the data disk DD only has a bar code zone 64 of an angle θDD and starting at the reference position INT. The remaining range of an angle (360°−θDD) is a quiet zone 66 without information of the photo film. Bearing holes 118 and 120 are formed by combining the shell halves 102 and 104, and support the spool 100 in a rotatable manner. The inside of the photo film cassette CFL is shielded from ambient light by the virtue of the cassette shutter 106 and the flanges 110 and 112.

Figure 4B:
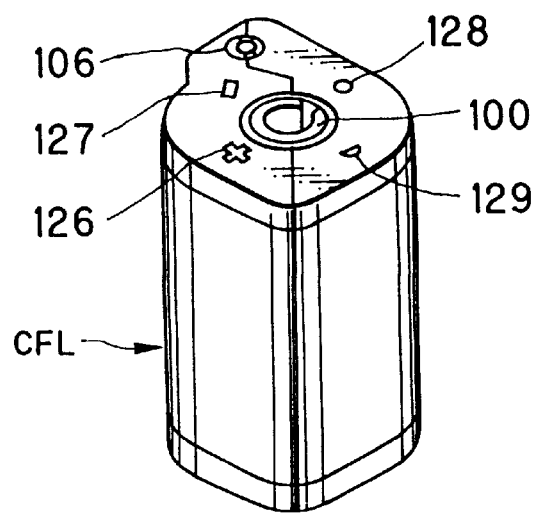
FIG. 4B is a perspective illustrating the cassette of which a data disk is oriented upwards.
Figure 5:
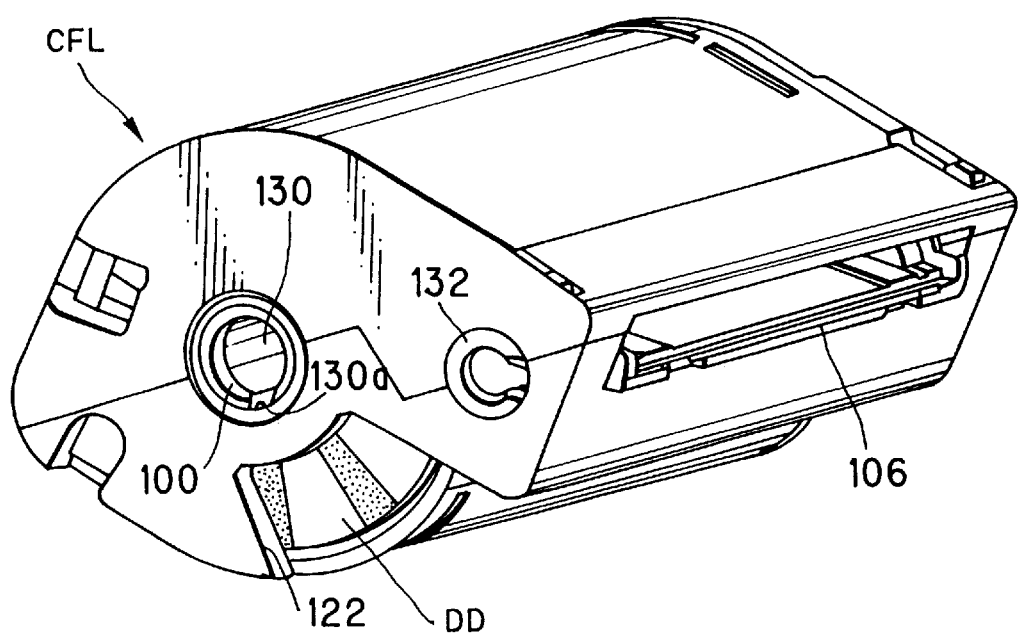
FIGS. 5 and 6 are perspectives illustrating the cassette in enlargement.
Figure 6:
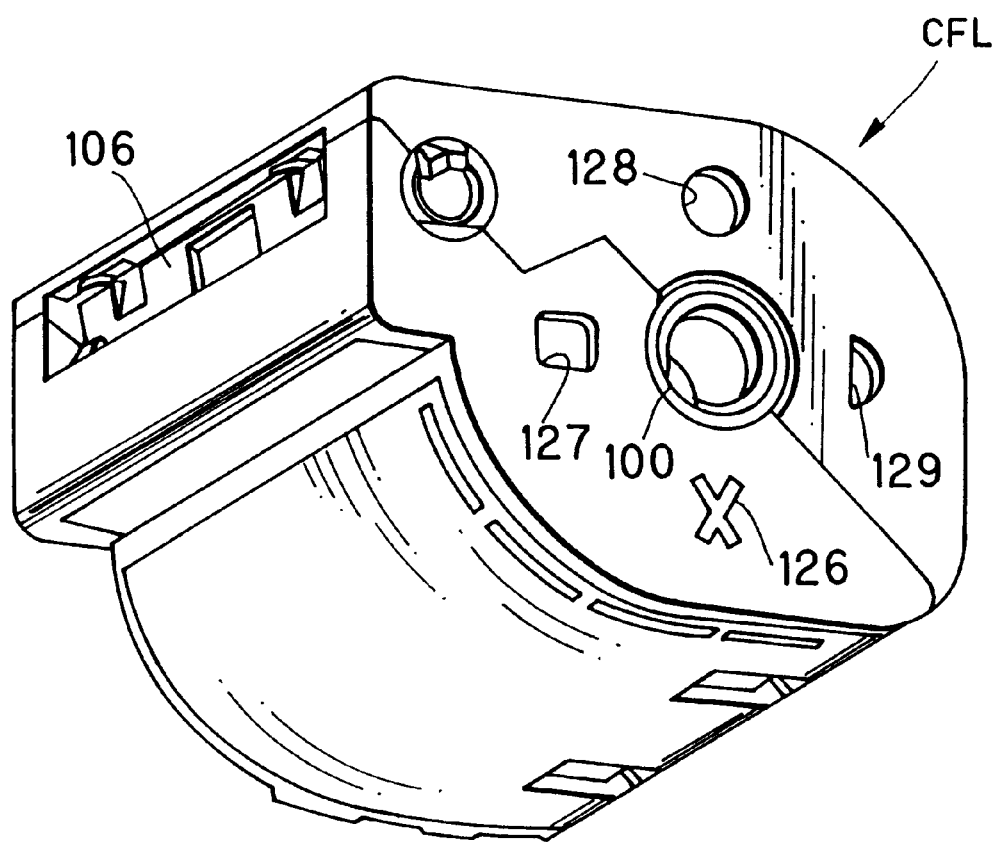

In FIG. 4A and in FIGS. 5 and 6, a rotary bar code of the data disk DD appears through two cutouts 122 and 124 formed in the top end face of the shell halves 102 and 104. In FIG. 4B, the cassette CFL is depicted upside down. A bottom end face of the shell halves 102 and 104 has an "x" indicia hole 126, a square indicia hole 127, a circular ("o") indicia hole 128 and a semi-circular ("D") indicia hole 129. The indicator tongue 116 is stopped behind one of the indicia holes 126–129, to indicate one of four statuses of the photo film FLM. The "x" indicia hole 126 represents an exposed status. The square indicia hole 127 represents a developed status. The circular ("o") indicia hole 128 represents an unexposed status. The semi-circular ("D") indicia hole 129 represents a partially exposed status.

The axial hole 130 on the axis of the flange 110 receives the spool drive shaft 34 (See FIG. 2). A key groove 130a is formed in the axial hole 130, and fitted on the projection 34a of the spool drive shaft 34, to transmit the rotation of the feeding motor 46 to the spool 100. The axial hole 132 is formed at the axis of the cassette shutter 106 to receive the shutter rotating shaft 36. The cassette shutter 106 is rotated in two directions by the shutter rotating shaft 36, to open/close the photo film passage port OP.

Figure 8:
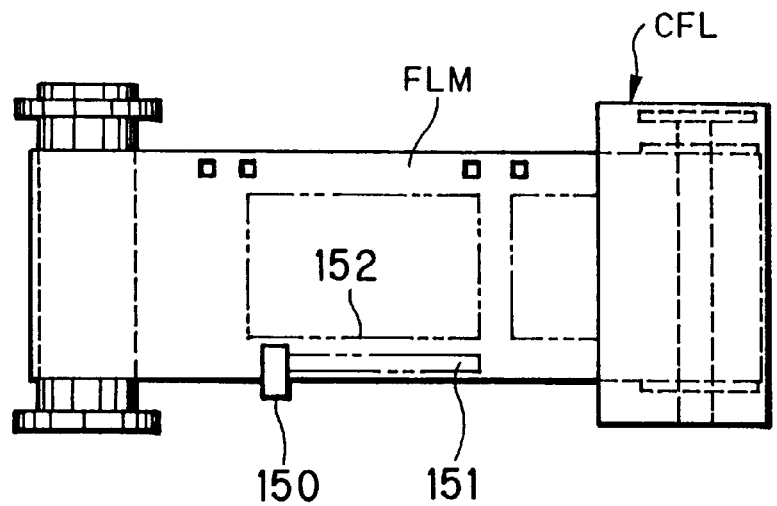
FIG. 8 is a plan illustrating the cassette, photo film, and a take-up spool of the camera.
Figure 8A:
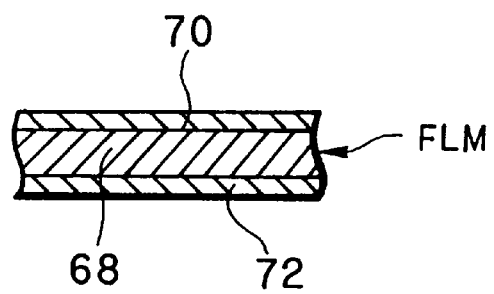
FIG. 8A is a cross section illustrating the photo film.

In FIG. 8, the photo film FLM is provided with a frame 152 by taking an exposure. The reference numeral 152 in FIG. 8 also designates a position of the exposure aperture which is located between the camera take-up spool 48 and the cassette CFL. The camera 2 has a magnetic information writer 150, which writes information to a magnetic recording area 151 of the photo film FLM. In FIG. 8A, the photo film FLM structurally includes a support material 68, a silver salt emulsion layer 70 located on an emulsion surface, and a magnetic recording layer 72, which consists of a transparent coating of magnetic material applied to a back surface of the support material 68. Details of the photo film FLM and the cassette CFL are disclosed in U.S. Pat. No. 5,130,745 and U.S. Pat. No. 4,978,985 (corresponding to JP-A 3-75741).

As referred to above, the spool 100 of the cassette CFL is rotatable only when the cassette shutter 106 is opened in the photo film passage port OP, because of engagement of the lock member 108 and the gear portion 114. For the spool drive shaft 34 to rotate the spool 100, the cassette shutter 106 requires setting in the open state.

In FIGS. 9A–9F, the camera 2 has an opener mechanism for setting open the cassette shutter 106 before rotating the spool 100.

Figure 9A:
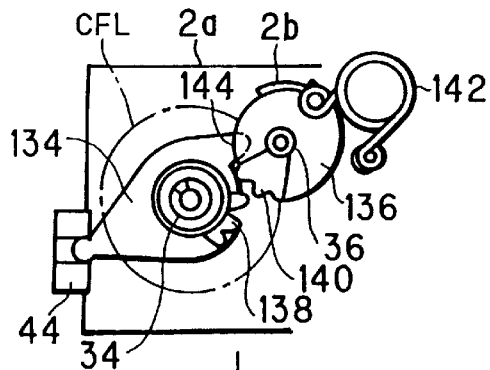
FIGS. 9A–9C are explanatory views in plans, illustrating an opener mechanism and a spool drive shaft at the time of inserting the cassette.

In the opener mechanism in FIG. 9A, a first cam plate 134 is rotatable in a manner separate from the spool drive shaft 34. A second cam plate 136 is rotatable integrally with the shutter rotating shaft 36 and supported in a camera chassis 2a. A first gear portion 138 is rotatable integrally with the spool drive shaft 34. A second gear portion 140 is rotatable integrally with the second cam plate 136. A coil spring 142 is disposed between the camera chassis 2a and the second cam plate 136. A stopper projection 2b projects over the camera chassis 2a and inhibits the second cam plate 136 from rotating when the second cam plate 136 has rotated as much as a predetermined angle. One end of the first cam plate 134 is constantly contacted on the lid-opener button 44 depicted in FIGS. 2A and 2B.

The operation of the camera of the present invention is described now. To indicate the exposed status at the "x" indicia hole 126 in the used cassette CFL', the spool drive shaft 34 is rotated and stopped in a predetermined angular position at the end of winding back of the photo film FLM. The indicator tongue 116 is positioned on the inside of the "x" indicia hole 126. Even after unloading the used cassette CFL' from the camera, the spool drive shaft 34 remains so positioned.

FIG. 10A illustrates this status. When the projection 34a of the spool drive shaft 34 is directed in the angle $\theta_{EXPOSED}$, the indicator tongue 116 of the spool 100 is positioned behind the "x" indicia hole 126, to indicate the exposed status. After the used cassette CFL' is unloaded from the camera, the projection 34a of the spool drive shaft 34 remains directed at the angle $\theta_{EXPOSED}$.

In the unused cassette CFL, the key groove 130a in the spool 100 has been stopped in an angular position $\theta_{UNEXPOSED}$ to indicate the unexposed status at the circular ("o") indicia hole 128. In FIG. 10B, the indicator tongue 116 is positioned on the inside of the circular ("o") indicia hole 128. The direction of $\theta_{UNEXPOSED}$ is differently determined from that of $\theta_{EXPOSED}$ of the exposed status. For example:

$$\Delta\theta = \theta_{UNEXPOSED} - \theta_{EXPOSED} = 157°.$$

When the cassette CFL being unused is loaded in the cassette containing chamber 32, the spool drive shaft 34 is not fitted in the axial hole 130 of the spool 100 as illustrated in FIG. 10C. The projection 34a interferes with an outer edge of the axial hole 130.

Again FIGS. 9A–9F are referred to. When the cassette CFL is loaded into the camera 2 where the opener mechanism standing by as shown in FIG. 9A, the opener mechanism starts rotation before the spool drive shaft 34 is fitted in the axial hole 130 in the spool 100 as illustrated in FIG. 10C.

At first the feeding motor 46 starts rotating in a reverse direction R1 of winding back the photo film. The spool drive shaft 34 and the first gear portion 138 rotate in reverse and together with the feeding motor 46. At a lapse of a short time, the first gear portion 138 comes in mesh with the second gear portion 140, so as to rotate the second cam plate 136 in a forward direction F1 against the bias of the coil spring 142. The spool drive shaft 34 is also rotating in the reverse direction R1, but has not yet been fitted in the axial hole 130 in the spool 100, which still remains stopped. The shutter rotating shaft 36 is rotated in the forward direction F1 with the second cam plate 136, to start opening the cassette shutter 106.

The second cam plate 136 rotates in the forward direction F1 in the course of rotation of the feeding motor 46 in the reverse direction R1. The cassette shutter 106 opens completely. In FIG. 9C, force of the coil spring 142 to the second cam plate 136 is changed from a first direction to an opposite direction, so that the open state of the cassette shutter 106 is kept even after the first gear portion 138 comes away from the second gear portion 140. Then the projection 34a of the spool drive shaft 34 is received in the key groove 130a in the spool 100, which is rotated in the reverse direction R1.

It follows that the spool drive shaft 34 has been oriented in the position $\theta_{EXPOSED}$ in insertion of the cassette CFL being unused. The opener mechanism effects mechanical control of rotating the spool 100 only after opening the cassette shutter 106. The cassette CFL is prevented from being damaged. The photo film FLM is prevented from being jammed.

The cassette shutter 106 being opened in this manner, a DEP_DD routine is executed to read the rotary bar code of the data disk DD optically. The feeding motor 46 is rotated forwards to feed out the unexposed photo film FLM through the photo film passage port OP toward the exposure aperture.

Figure 9D:
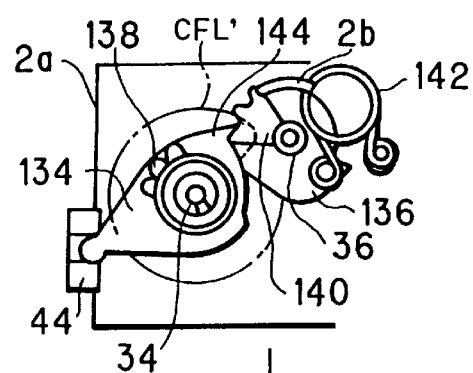
FIGS. 9D–9F are explanatory views in plans, illustrating the opener mechanism and the spool drive shaft at the time of unloading the cassette.
Figure 9B:
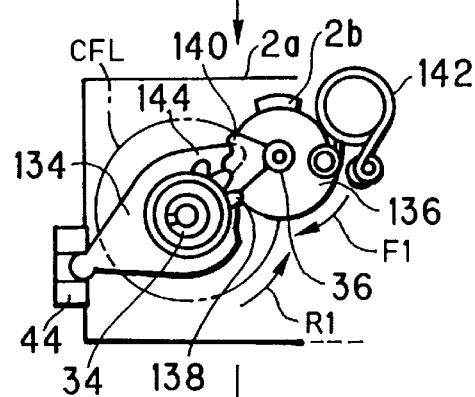
Figure 9E:
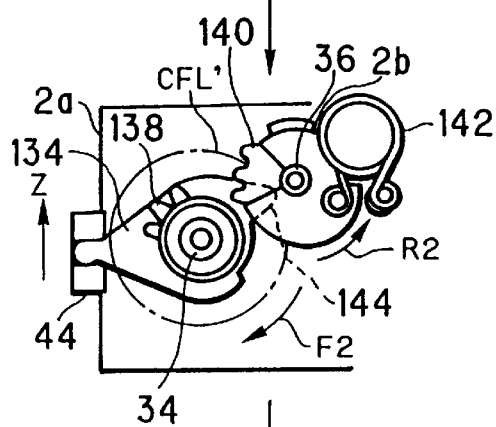
Figure 9C:
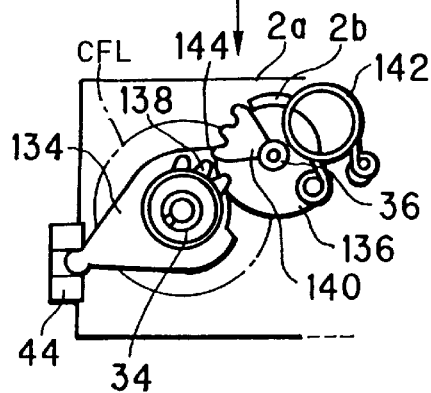
Figure 9F:
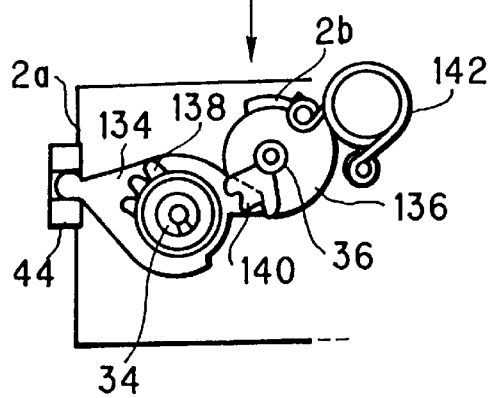

In FIGS. 9D, 9E and 9F, the cassette shutter 106 is being closed. In FIG. 9D, the photo film FLM after taking all exposures has been wound back into the cassette shell. The cassette shutter 106 is open, because the used cassette CFL' still lies in the camera 2 before the unloading.

In FIG. 9E, when the user slides the lid-opener button 44 in a direction Z, the first cam plate 134 rotates in a direction F2. A cam projection 144 pushes an end of the second cam plate 136, which is rotated in a direction R2 against the bias of the coil spring 142. The force of the coil spring 142 to the second cam plate 136 is changed back from the opposite direction to the first direction, so that the cassette shutter 106 connected to the second cam plate 136 is immediately closed as illustrated in FIG. 9F. Accordingly the cassette shutter 106 is finally closed before unloading of the used cassette CFL' from the camera 2. The photo film FLM is prevented from being subjected to ambient light.

The used cassette CFL' after exposures is controlled to have indication at the "x" indicia hole 126. As described above, the projection 34a of the spool drive shaft 34 is stopped at the angle $\theta_{EXPOSED}$.

Referring to FIGS. 11A–19, the general operation of the camera 2 is described. CPU 56 incorporated in the camera 2 executes a control program previously stored by following the routines below.

Figure 11A:
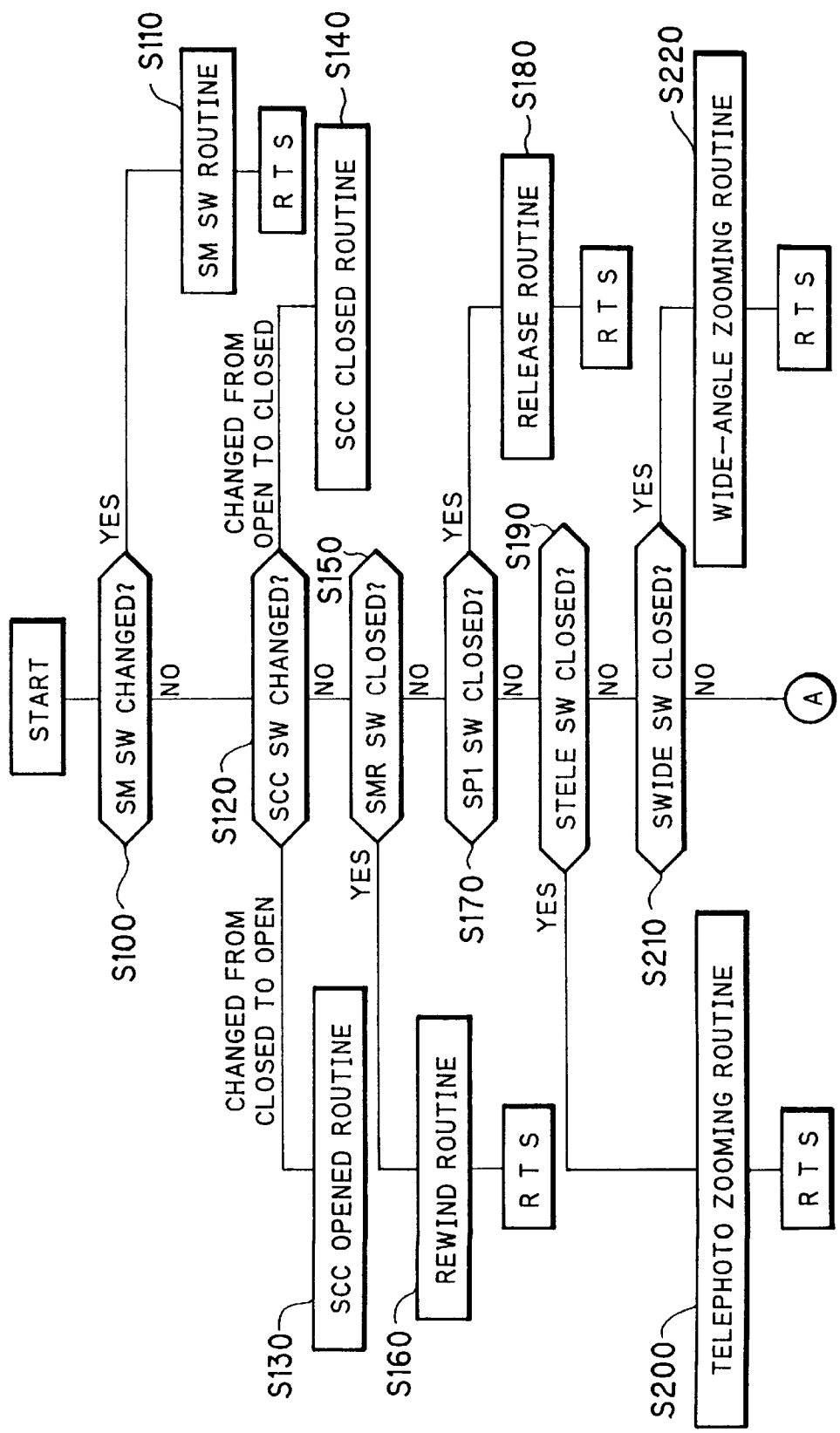

FIG. 11A illustrates a main routine, according to which CPU 56 effects various controls upon operation of the respective switches disposed outside the camera 2.

The SM switch 16 is depressed for powering the camera 2. It is detected at S100 in the flow as depicted whether the state of the SM switch 16 is changed. Then a SM switch routine of S110 for the SM switch 16 is executed. If the camera 2 has been turned on before S100, then the camera 2 is powered. If the camera 2 has been turned off before S100, then the camera 2 is turned off. The SM switch 16 consists of a pushbutton, which is pushed for one time to turn on or off the camera 2, and which is pushed for two times to return the camera 2 to the state before operation of the SM switch 16.

An output of the SCC switch of the lid 30 is checked at S120. It is evaluated at S120 whether and how the state of the SCC switch is changed. If the lid 30 is changed from the closed state to the open state, an SCC opened routine of S130 is executed. If the lid 30 is changed from the open state to the closed state, an SCC closed routine of S140 is executed.

If there is no operation of opening/closing the lid 30, it is evaluated at S150 whether the SMR switch is closed. If it is, then a Rewind routine of S160 is executed to wind the entirety of the photo film FLM back into the cassette CFL in a forcible manner even when the photo film FLM is partially exposed. When the shutter release button 14 is depressed, it is detected at S170 that the SP1 switch is closed. A Release routine of S180 is executed to effect exposure by driving the shutter device 14a. When the zoom lever 20 is pushed in the Telephoto direction, it is detected at S190 that the STELE switch is closed. A Telephoto zooming routine of S200 is executed to shift the lens barrel 4 in the Telephoto direction, and additionally to effect automatic focus control and exposure control. When the zoom lever 20 is pushed in the Wide-angle direction, it is detected at S210 that the SWIDE switch is closed. A Wide-angle zooming routine of S220 is executed to shift the lens barrel 4 in the Wide-angle direction, and additionally to effect automatic focus control and exposure control.

In FIG. 11B, it is evaluated at S230 whether the SMODE switch 18 is closed. Upon the closing, a Flash mode set routine of S240 is executed to indicate information of flash charging and a flash mode in the LCD panel 22. It is evaluated at S250 whether a self-timer switch or SSELF switch is closed. Upon the closing, a Self mode set routine of S260 is executed to set a self mode in which a photograph can be taken with a self timer. It is evaluated at S270 whether an SDMODE switch is closed. Upon the closing, a Date mode set routine of S280 is executed to set a date mode, in which there is an indication of a year, month, day, hour and minute of a date in digits of the LCD panel 22. It is evaluated at S290 whether the SDSEL switch is closed. Upon the closing, a Date digit designate routine of S300 is executed to designate one of the eight digits of the LCD panel 22. It is evaluated at S310 whether the SDSET switch is closed. Upon the closing, a Data digit adjust routine of S320 is executed to adjust a selected one of the eight digits of the LCD panel 22.

Those routines are effected by executing programs in forms of sub-routines. Upon an end of each routines, the operation restarts from S100.

The SCC opened routine of S130 and the SCC closed routine of S140 are based upon detection of opening or closing of the lid 30 in association with loading or unloading the cassette CFL. Those routines have purposes of starting basic processes in accordance with presence or absence of the cassette CFL.

Figure 13:
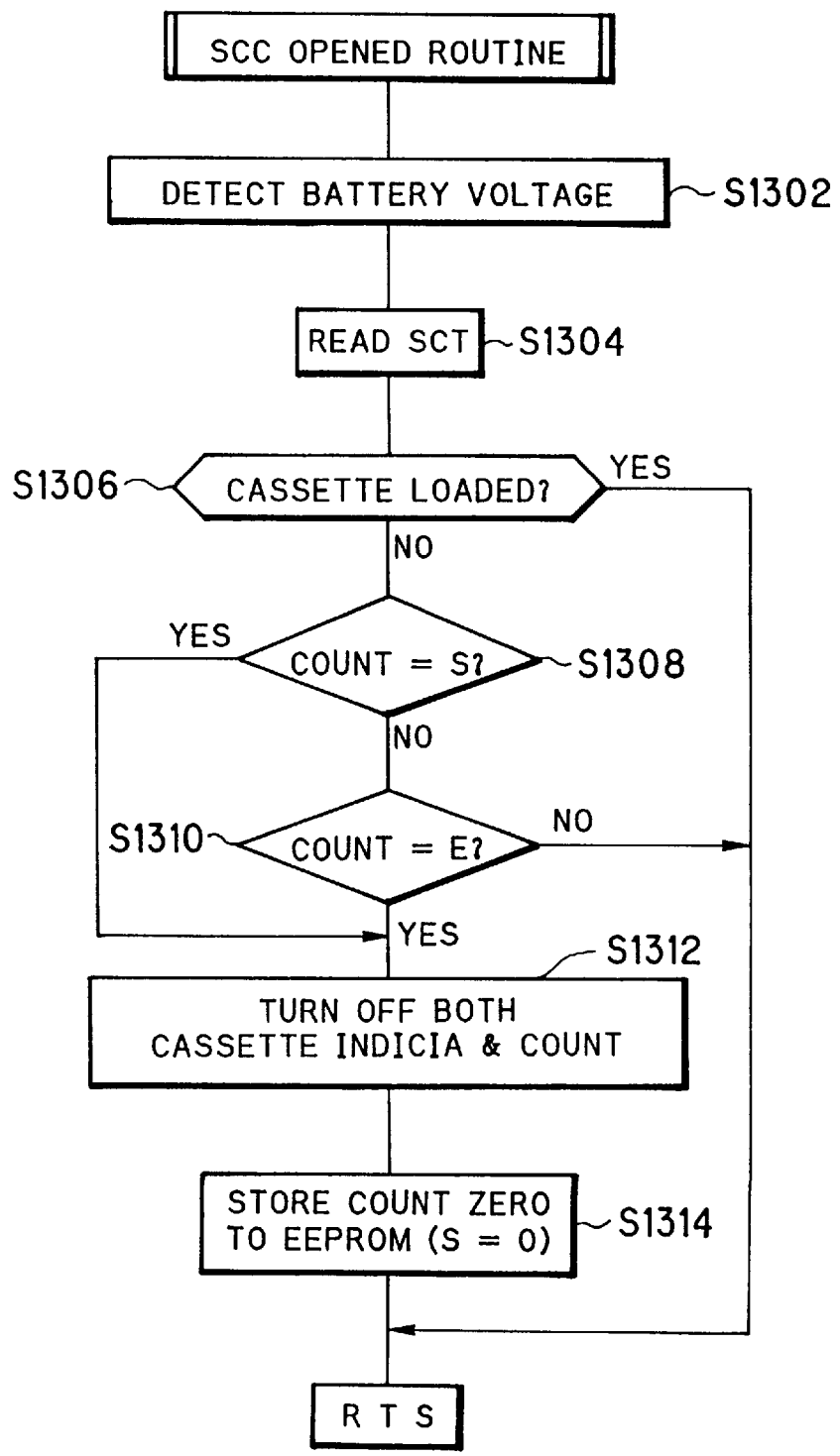
FIG. 13 is a flow chart illustrating an SCC opened routine after the SCC switch is opened.

The SCC opened routine of S130 is according to the flow of FIG. 13. At S1302, a voltage of the battery as power source is detected. At S1304, the SCT output of the SCT switch 40 is read. At S1306, the output of the SCT switch 40 is evaluated to determine whether the cassette CFL is loaded in the cassette containing chamber 32. If it is, the cassette CFL is estimated as a used cassette CFL' which a user is about to remove. Then the SCC routine is ended without any further steps.

If it is detected at S1306 that no cassette is loaded, then it is evaluated at S1308 whether the count of frames is "S" in accordance with frame count data stored in EEPROM 54. The frame count data is data representing the number of remaining unexposed frames.

The sign "S" means the frame count "0" (zero). When the cassette CFL being entirely unused is removed from the cassette containing chamber 32, "S" is written to EEPROM 54 in response to turning off the SCT switch 40. If it is detected at S1308 that the count of frames is "S", then no cassette CFL is detected. At S1312, both the cassette indicia CM and the count are turned off in the LCD panel 22. At S1314, the count zero is stored to EEPROM 54 (S=0). Also standard photo film information is stored to other regions of EEPROM 54, before ending the routine. The standard photo film information herein is default information including ISO 200 as photo film speed, 40 as number of available frames, and color negative type as photo film type.

If the count of frames is not "S" at S1308, then EEPROM 54 is accessed at S1310 and it is evaluated whether the count of frames is "E" in accordance with the frame count data stored in EEPROM 54. The frame count data is data representing a number of remaining unexposed frames.

The sign "E" represents a fact of previous unloading of the used cassette CFL' in the course of use of the camera 2. When the photo film FLM being exposed is entirely wound back, "E" is written to EEPROM 54 as soon as the indicator tongue 116 is positioned at the "x" indicia hole 126. If it is detected at S1310 that the count of frames is "E", then it is confirmed that the used cassette CFL' has been removed from the camera. The steps of S1312 and S1314 are executed similarly, before ending the routine.

If the count of the pulses is not "E" at S1310, then it is detected that the lid 30 is moved in an opening or closing direction directly after purchase of the camera 2 and without any insertion of a the cassette CFL. The routine is terminated without further operation.

The SCC opened routine is a routine in which it is evaluated if the cassette CFL is unloaded or not after exposures.

Figure 12:
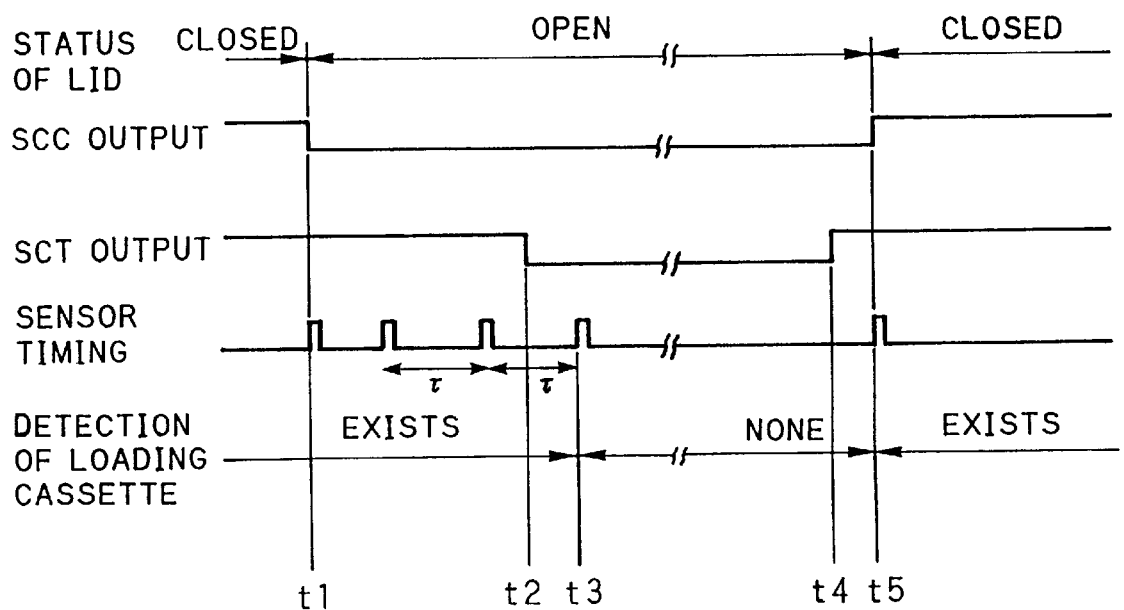
FIG. 12 is a timing chart illustrating detection of cassette existence according to outputs of switches.

FIG. 12 is a timing chart illustrating changes in voltage of outputs of the SCC switch and the SCT switch 40, which are monitored by CPU 56. In FIG. 12, the lid 30 is opened at a time t1, at which the SCC output changes from a "High" level to a "Low" level. CPU 56 detects this repeatedly at a predetermined period, for example 250 msec approximately. Then the SCC opened routine is started. At a time t2, the lid 30 is opened for unloading the cassette CFL. The SCT output of the SCT switch 40 changes from the "High" level to the "Low" level. This is detected by CPU 56 similarly. At a time t3, the SCT output of the SCT switch 40 becomes zero. Then unloading of the cassette CFL is detected.

When both outputs of the SCC switch and the SCT switch 40 are "Low", it is detected that no cassette CFL is loaded in the camera 2. At a time t4, the cassette CFL is loaded to change the output of the SCT switch 40 from the "Low" level to the "High" level. At a time t5, the lid 30 is closed to cause detection of loading of the cassette CFL.

Again in FIG. 11A, if it is detected at S120 that the SCC switch is closed, then the SCC closed routine of S140 is executed. See FIG. 14 illustrating a flow of the SCC closed routine.

Figure 14:
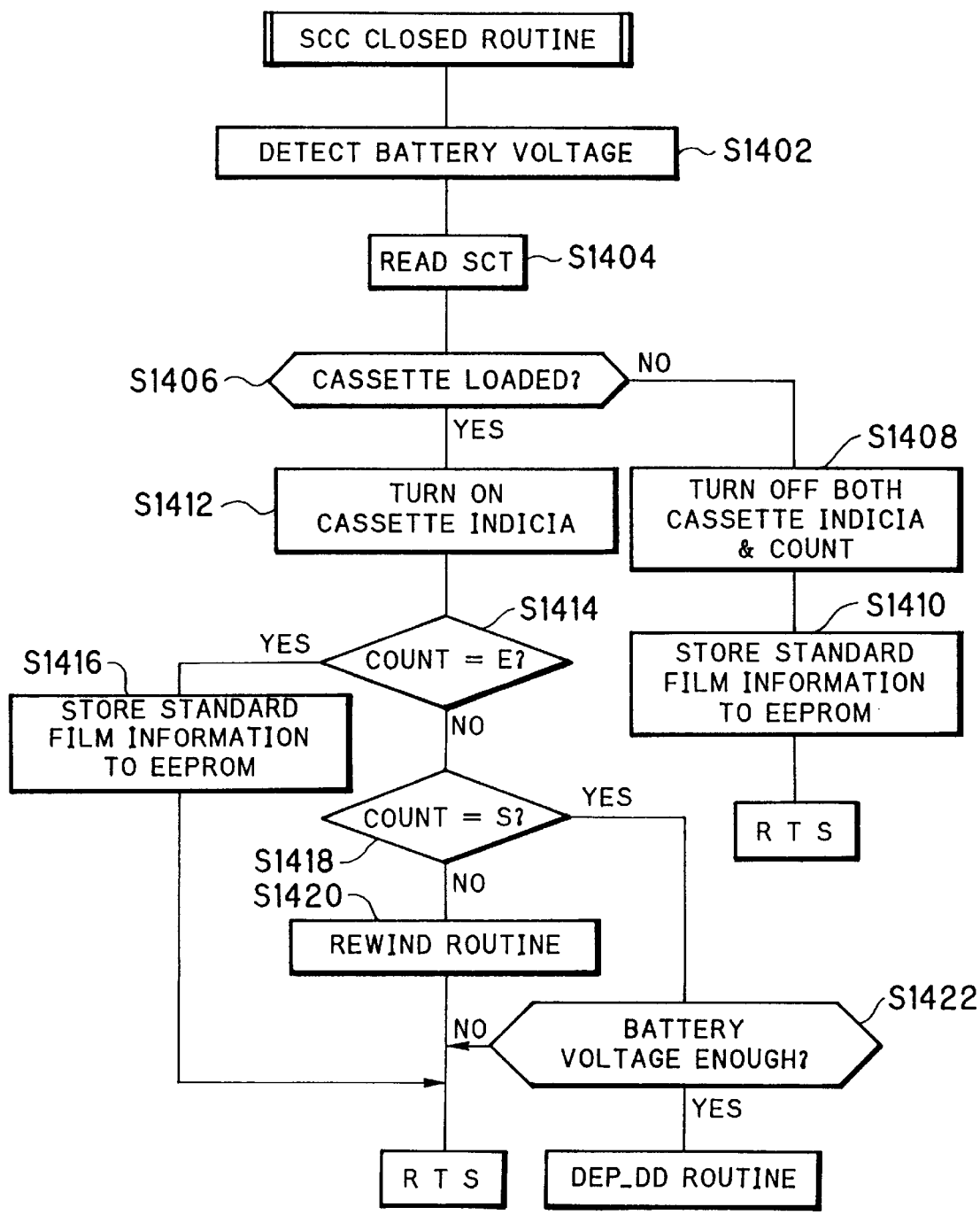
FIG. 14 is a flow chart illustrating an SCC closed routine after the SCC switch is closed.

In FIG. 14, the battery voltage is detected at S1402 in the SCC closed routine. At S1404, the SCT output, either "High" or "Low", is read. At S1406, it is evaluated from the SCT output whether the cassette CFL is newly loaded.

Referring to FIG. 12, the SCT output of the SCT switch 40 is "High" at the time t5. It is detected that the cassette CFL is loaded newly. At S1404 of FIG. 14, the SCT output is read. If the SCT output goes "High", it is detected at S1406 that the cassette CFL is loaded in the cassette containing chamber 32 after closing the lid 30. Then operation of S1412 is effected.

If the SCT output of the SCT switch 40 goes "Low", it is detected at S1406 that no cassette CFL is loaded in the cassette containing chamber 32 while the lid 30 is closed. Then operation of S1408 is effected.

At S1408, both the cassette indicia CM and the count of the frame number are kept turned off in the LCD panel 22, to display absence of a cassette CFL. At S1410, the standard photo film information is written to EEPROM 54. Then the SCC closed routine is ended.

In short, if the lid 30 is closed and if no cassette CFL is loaded, then no operation occurs for taking an exposure. The feeding motor 46 and the spool drive shaft 34 remain stopped and stand by. The projection 34a of the spool drive shaft 34 stands directed at the angle $\theta_{EXPOSED}$. When the cassette CFL is loaded next, it is possible to open the cassette shutter 106 before rotating the spool 100.

The flow including S1406, S1408 and S1410 is used for reliable detection of a simple movement of the lid 30 in absence of the cassette CFL. The projection 34a of the spool drive shaft 34 is kept in the position of $\theta_{EXPOSED}$ without moving away incidentally therefrom. This is effective in successfully taking exposures after loading next cassette CFL.

If it is detected at S1406 that the cassette CFL is loaded, then the cassette indicia CM is turned on at S1412 in the LCD panel 22 for information to a user.

Then the frame count data in EEPROM 54 is checked at S1414, where it is evaluated whether the count of frames is "E". If so, it is detected that the lid 30 is simply moved in an opened or closed direction with the used cassette CFL' inserted. At S1416, the standard photo film information is stored to EEPROM 54. The SCC closed routine is ended.

At S1414, if it is detected that the count of frames is not "E", then it is evaluated at S1418 whether the count of frames is "S". If it is detected that the count of frames is not "S", then it is recognized that the photo film FLM is partially exposed and partially unexposed in the cassette CFL in the camera 2. Consequently it is estimated that the lid 30 is erroneously opened despite remaining frames of the photo film FLM in the camera 2. The photo film FLM is possibly fogged by ambient light. The Rewind routine of S1420 is effected to wind back the photo film FLM into the cassette CFL automatically. The SCC closed routine is ended.

If the count of frames is "S" at S1418, then it is confirmed that the cassette CFL is normally loaded in the cassette containing chamber 32 and the lid 30 is closed. This is because, when the cassette CFL is normally loaded, the frame count data in EEPROM 54 is set as S=0 (zero) in synchronism with closing of the SCT switch 40. Then at S1422, the battery voltage is checked to remain enough. Then the DEP_DD routine is effected, in which the data disk DD of the cassette CFL is read.

Figure 15:
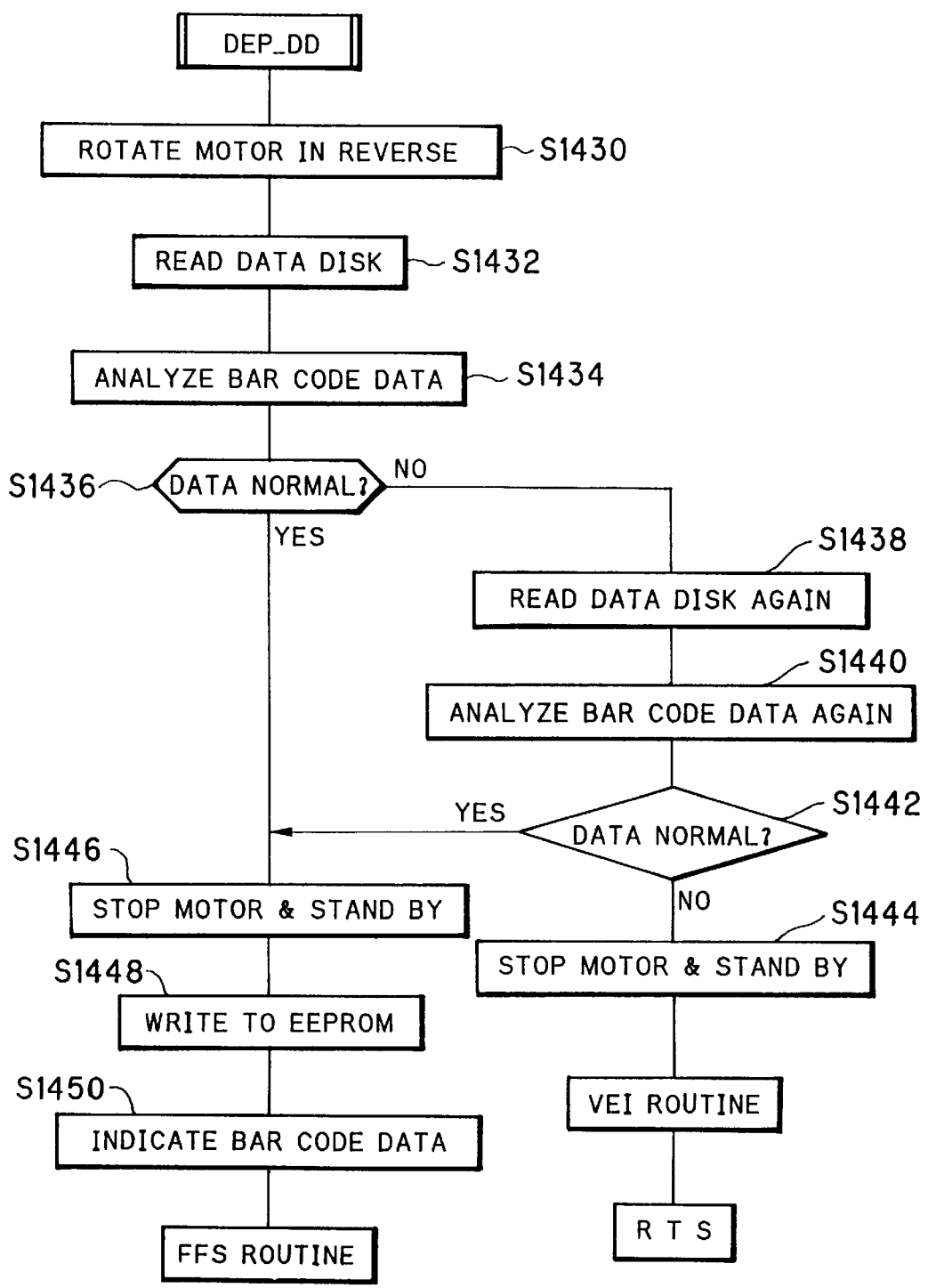
FIG. 15 is a flow chart illustrating a DEP_DD routine in which the data disk is read.

The DEP_DD routine is depicted in FIG. 15. The SCC closed routine of FIG. 14 does not detect the cassette CFL any more from the shape or contour of the cassette CFL according to the SCC switch or the SCT switch 40. It is necessary to check acceptability of the cassette CFL as loaded. For this check, the rotary bar code of the data disk DD is read for recognizing the photo film information by executing the DEP_DD routine of FIG. 15.

At S1430, the feeding motor 46 of the spool drive shaft 34 starts rotating in reverse. In FIGS. 9A–9C, the cassette shutter 106 is opened by rotation of the second cam plate 136 and the shutter rotating shaft 36. The spool drive shaft 34 is fitted in the axial hole 130 in the spool 100, which is rotated in reverse. The data disk DD is rotated in the same direction.

At S1432, the data disk DD is read optically by the bar code reader 38 while the data disk DD is caused to make two rotations for example. Two sets of data being read are stored in CPU 56 in a temporary manner. At S1434, the bar code data is analyzed by comparing the data from the first rotation is compared with that from the second rotation, to confirm correctness of reading upon detecting coincidence of the data. Also at S1434, the data being correctly read is identified by the type determiner section 84 referring to a plurality of preset bar code data according to the standards defined in the camera.

In short, the bar code consists of an arranged set of wide black bars, narrow black bars, wide voids and narrow voids in accordance with the standards of the photo film cassette. Detailed description of the bar code is herein omitted. If a bar code of a certain cassette is not consistent to the standards determined in the camera 2, it is detected at S1436 that the inserted cassette is not normal. If it is detected at S1436 that the cassette CFL is normal, succeeding steps including S1446 are executed.

If it is detected at S1436 that the data is not normal but either defective, incompatible to the standards, or different from the IX240 type, then at S1438, the data disk DD is read again. At S1440, the bar code data is analyzed again. It is evaluated at S1442 whether the data after S1440 is normal. If it is, the step of S1446 is executed.

If it is detected at S1442 for the second time that the data is not normal but either defective or incompatible to the standards, then the feeding motor 46 of the spool drive shaft 34 is stopped at S1444. A VEI routine is effected before terminating operation of the camera 2. The VEI routine is described later in detail.

The VEI routine is originally constructed as a routine for winding the exposed photo film back into the cassette CFL to cause a user to unload the cassette CFL. But the VEI routine is executed also when unacceptable or incompatible data is read at S1442, or if a cassette having the same shape as the cassette CFL but different purposes of use in other imaging instruments be inserted and handled by the DEP__DD routine, or when a photo film cassette without printing of bar code data. Accordingly, in response to detection of insertion of those unacceptable cassettes, the VEI routine is forcibly executed to stop the exposure operation, while inhibiting an FFS routine for feeding the photo film.

When the bar code data being read is normal at S1436, then the feeding motor 46 of the spool drive shaft 34 is stopped at S1446. At S1448, EEPROM 54 is accessed to rewrite the frame count data as S=0 therein. At S1450, the LCD panel 22 is driven to indicate the bar code data of the ISO sensitivity and the photo film type in addition to the cassette indicia CM. Then the FFS routine for one-frame feeding of the photo film FLM is started.

Figure 16:
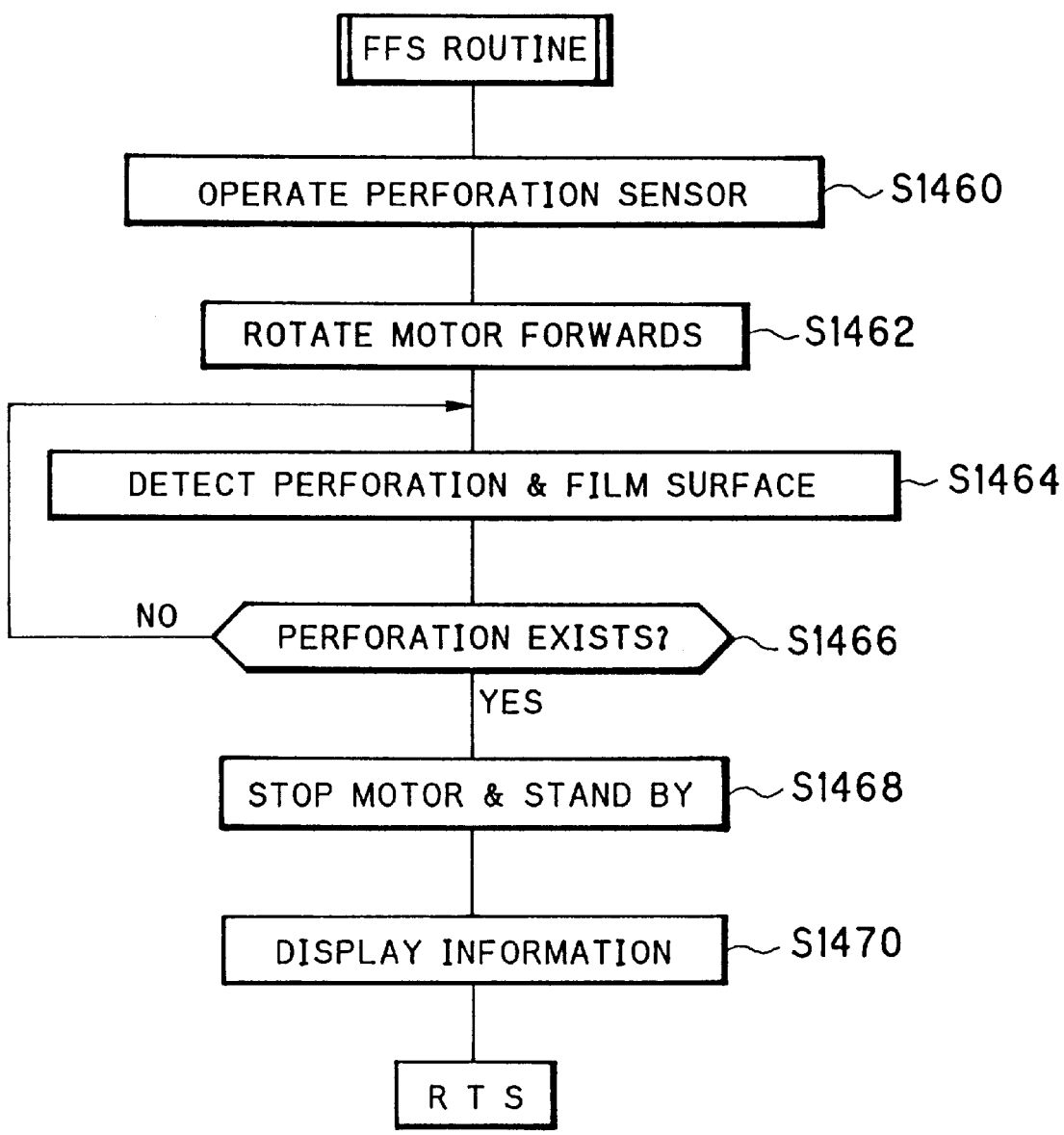
FIG. 16 is a flow chart illustrating an FFS routine in which the photo film is fed.
Figure 17:
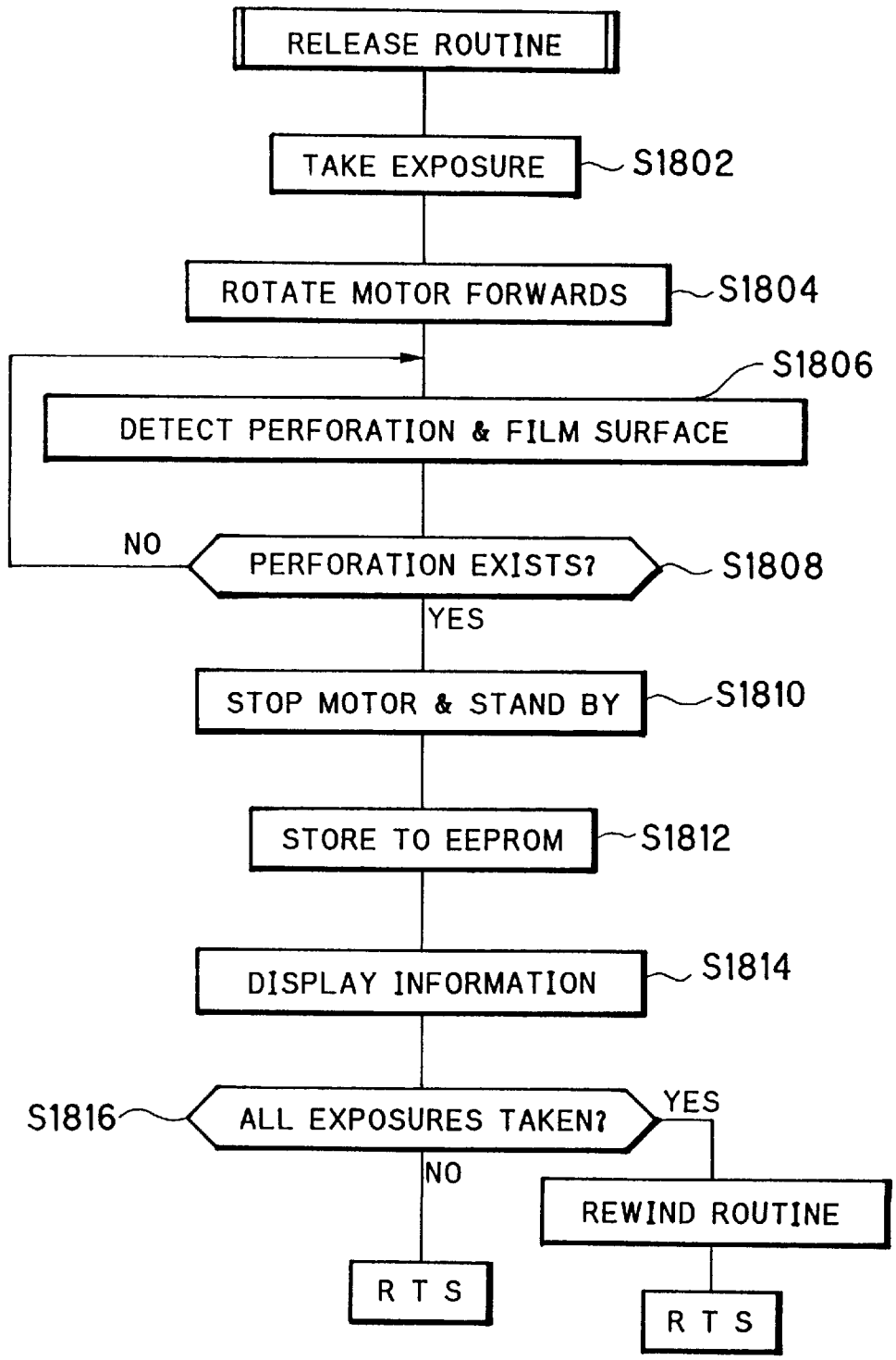
FIG. 17 is a flow chart illustrating a Release routine in which an exposure is taken by releasing the shutter.

The FFS routine is effected according to the flow of FIG. 16. At S1460, a perforation sensor in the camera 2 is caused have an active state. At S1462, the feeding motor 46 of the spool drive shaft 34 is rotated forwards. The spool 100 is rotated forwards, to start feeding the photo film FLM through the photo film port OP toward the exposure aperture. The take-up spool 48 rotated by the feeding motor 46 (See FIG. 36) takes up the leader of the photo film FLM and winds it thereabout.

At S1464, perforations and photo film surface of the photo film FLM are detected by detecting an amount of reflected light from the photo film FLM. At S1466, it is evaluated in CPU 56 whether a perforation exists upon abrupt decrease of the reflected light. At S1468, the feeding motor 46 of the spool drive shaft 34 and the take-up spool 48 is stopped by the motor control section 82. A first frame of the photo film FLM is set on the exposure aperture. Then at S1470, information of the available number of unexposed frames is displayed on the LCD panel 22. The FFS routine is ended.

In short, when the cassette CFL being normal is loaded, the photo film information is read through the DEP__DD routine, before the FFS routine for standing by for an exposure to a first frame.

In this standby state, the user depresses the shutter release button 14. In FIG. 1, the Release routine at S180 is executed according to the flow of FIG. 17.

In the Release routine, an exposure is taken at S1802 by driving the shutter device 14a after the automatic focus control and exposure control. Then at S1804, the feeding motor 46 of the spool drive shaft 34 is rotated forwards. At S1806, a perforation and a photo film surface are detected optically by the perforation sensor. It is evaluated at S1808 whether a perforation exists by CPU 56 detecting an abrupt decrease of the sensor output. When one perforation exists, then at S1810 the feeding motor 46 of the spool drive shaft 34 is stopped and stands by. At S1812, the frame count data of remaining available frames is stored to EEPROM 54. At S1814, the number information of the frames is displayed in the LCD panel 22.

At S1816, it is evaluated whether all exposures to the available frames have been taken. If not, namely if there are remaining frames, then the Release routine is ended so as to stand by for next operation of the user. Upon depression of the shutter release button 14 for a second time, the operation is effected again according to S1802.

If it is detected at S1816 that all exposures to the available frames have been taken, then the Rewind routine is executed automatically.

The Rewind routine is effected in a manner similar to the forcible operation at S160 in FIG. 1. To be precise, the VEI routine is effected according to FIGS. 18 and 19.

Figure 18:
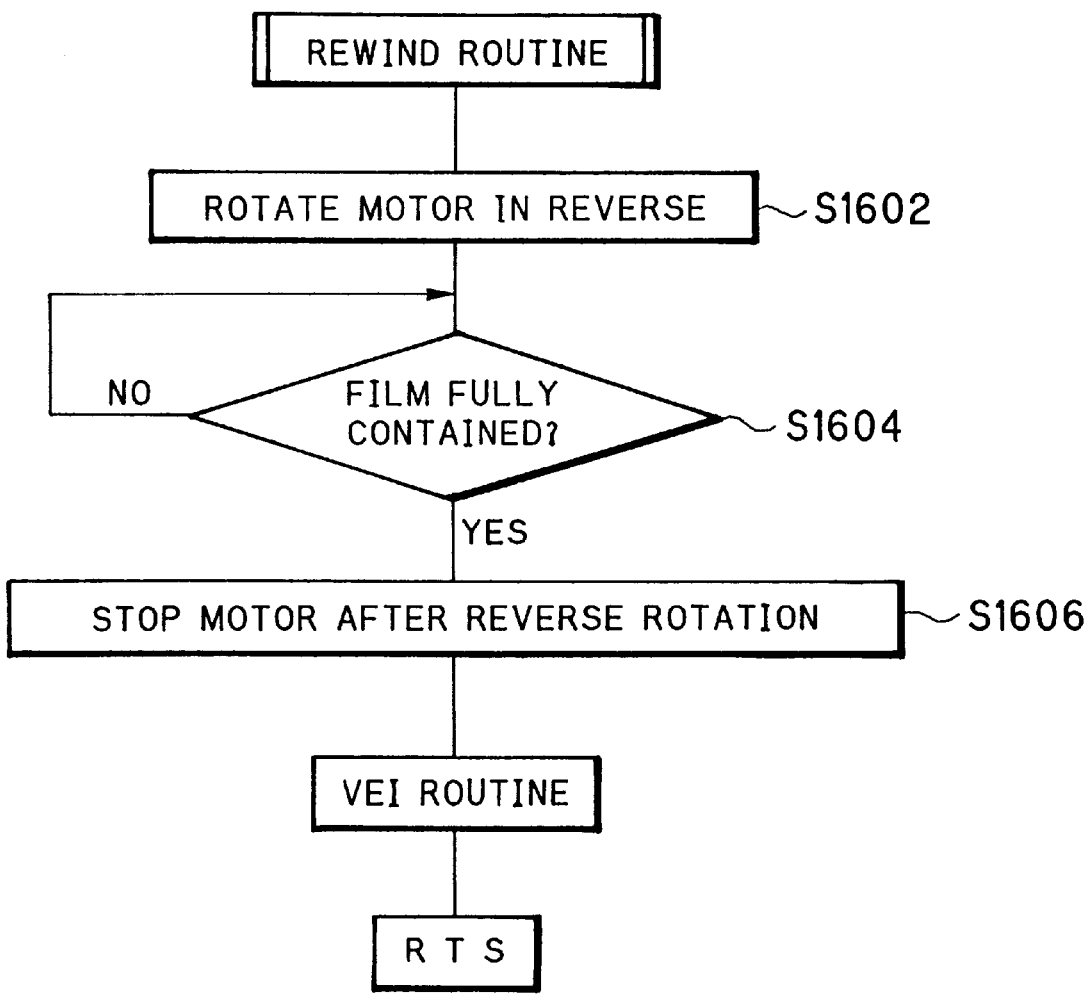
FIG. 18 is a flow chart illustrating a Rewind routine in which the photo film is wound back.

At S1602 in FIG. 18, the feeding motor 46 of the spool drive shaft 34 is rotated in reverse for rotating the spool 100 in this direction. The photo film FLM is wound back. It is optically evaluated at S1604 whether the photo film FLM is fully contained. If so, then at S1606 the feeding motor 46 of the spool drive shaft 34 is further rotated in reverse for a predetermined time, and then is stopped. The step of S1606 is effective in finally winding the entirety of the photo film FLM about the spool 100. The cassette shutter 106 still remains open.

Figure 19:
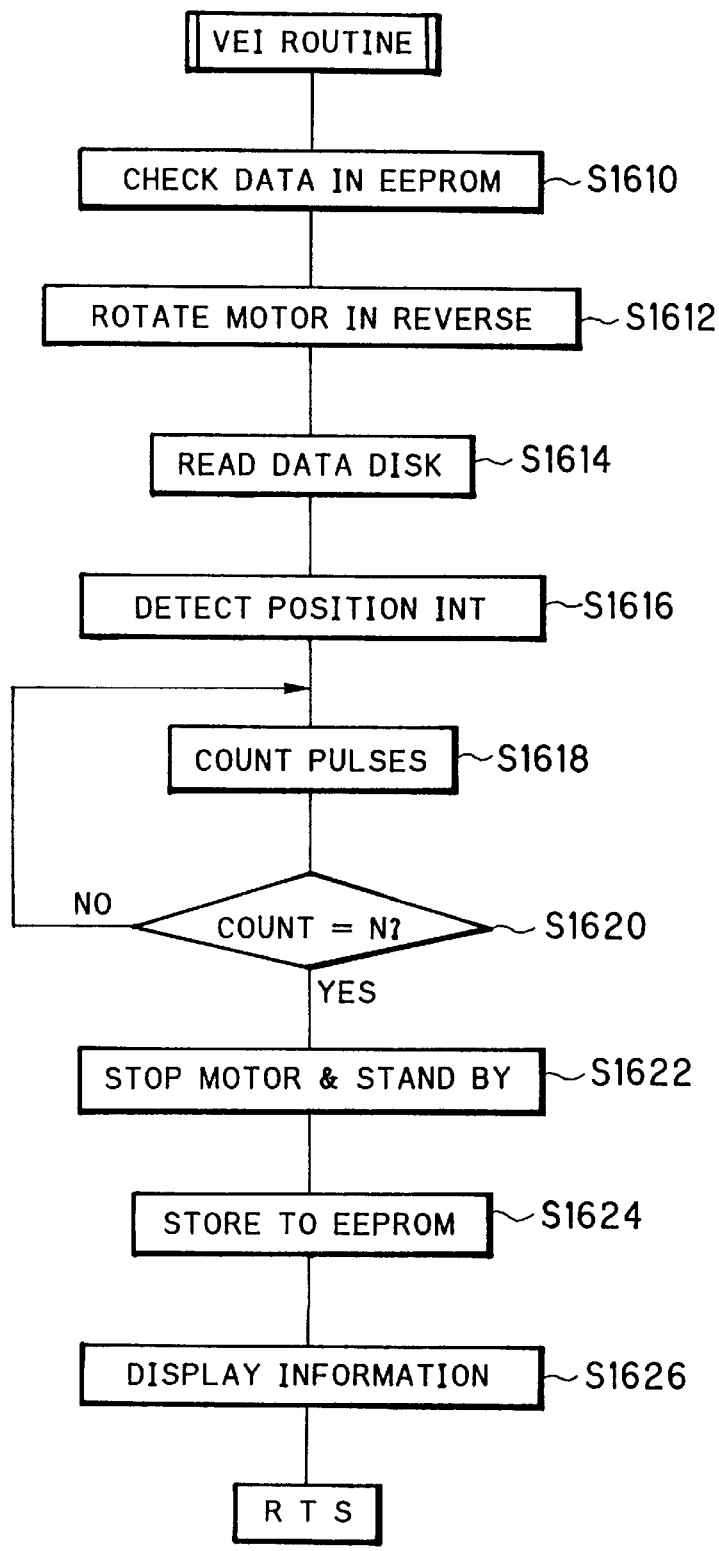
FIG. 19 is a flow chart illustrating a VEI routine in which the spool is stopped while orienting the indicator tongue in a predetermined direction.

The VEI routine is depicted in detail in FIG. 19.

At S1610 of FIG. 19, the frame count data in EEPROM 54 is checked. At S1612, the feeding motor 46 of the spool drive shaft 34 is rotated in reverse again, for reverse rotation of the spool 100.

At S1614, the data disk DD is read in a manner similar to the DEP__DD routine above. The bar code data and the quiet zone 66 of the data disk DD are read by the bar code reader 38. At S1616, the position INT is detected as a border between the bar code data and the quiet zone 66. The detection of the reference position INT is effected as follows: While the quiet zone 66 is detected, the output of the bar code reader 38 is "Low" for a sufficiently long time. While the bar code data including black and void portions is detected, the output of the bar code reader 38 becomes "Low" and "High" in a shortly alternate manner. CPU 56 monitors those changes in the output of the bar code reader 38. Upon detecting a change to the "High" level after long time of the "Low" level, CPU 56 determines a position of the reference position INT. At the same time CPU 56 sets a count $N_{INT}$ according to pulses from the photo interrupter. In FIG. 10B, an angle $\theta_I$ defined between the reference position INT and the position $\theta_{EXPOSED}$ is unchanged. A value N is also constant, as the number of pulses output from the photo interrupter for rotation as much as the angle $\theta_I$. Accordingly the number N of pulses required for directing the indicator tongue 116 to the "x" indicia hole 126 is calculated according to the following equation:

$$N = N_{INT} + N_I$$

At S1618, pulses are counted. It is evaluated at S1620 whether the count of frames is "N" according to pulses from the photo interrupter. When the count of frames becomes "N", then at S1622 the feeding motor 46 of the spool drive shaft 34 is stopped. The indicator tongue 116 is stopped at the "x" indicia hole 126, to indicate the status of a used cassette CFL'. The projection 34a of the spool drive shaft 34 is also directed at the angle of $\theta_{EXPOSED}$. Even when the used cassette CFL' is unloaded from the camera 2, the spool drive shaft 34 remains oriented at $\theta_{EXPOSED}$, Next acceptable unused cassette CFL being loaded, it is possible as described with FIGS. 9A–9F to rotate the spool 100 after opening the cassette shutter 106, and to effect exposures in a normal manner. At S1624, the frame count data of "E", which represents the status of the used cassette CFL', is stored to EEPROM 54. At S1626, the sign "E" is displayed in the LCD panel 22 to indicate the end of the winding back. The VEI routine is ended. Note that, when a used cassette CFL is unloaded, changes in the outputs of the SCC switch and the SCT switch 40 are detected to turn off the cassette indicia CM and the sign "E" in the LCD panel 22, to inform the absence of the cassette CFL.

In short, the VEI routine is a routine for stopping the spool while orienting the indicator tongue 116 at the angle $\theta_{EXPOSED}$ to indicate the exposed status with the "x" indicia hole 126. The sign "E" is also indicated in the LCD panel 22 to inform a user of the exposed status.

The user unloads the used cassette CFL' and loads an unused cassette CFL. The main routine of FIG. 1 is repeated to take another exposure.

When it is detected in the DEP_DD routine of FIG. 15 that a wrong cassette inconsistent to the standard determined in the camera 2, then the VEI routine is forcibly started. In a manner similar to the used cassette CFL', the exposed status with the "x" indicia hole 126 is indicated. The projection 34a of the spool drive shaft 34 is stopped at the angle $\theta_{EXPOSED}$. Even after the wrong cassette is inserted, it is possible upon insertion of next normal cassette to cause the spool 100 to rotate after opening the cassette shutter 106. Exposures can be taken reliably.

As described heretofore, the present invention is effective in avoiding damaging a photo film cassette. This is because, if a cassette incompatible to the standards, this status is detected by the DEP_DD routine, to execute the VEI routine without effecting the FFS routine. The spool drive shaft 34 is stopped in the position $\theta_{EXPOSED}$. A normal cassette CFL is inserted next. Before reverse rotation of the spool for the DEP_DD routine, the opener mechanism opens the cassette shutter 106 to set the spool 100 rotatable. The spool drive shaft 34 is fitted on the spool 100 to rotate the data disk DD in the reverse direction.

The present invention is applicable to operation in which, when the lid 30 is moved in the opening or closing direction without inserting any cassette in the cassette containing chamber 32, the absence of a cassette is detected by effecting the DEP_DD routine. It is possible that the VEI routine is used to cause the spool drive shaft 34 to make one rotation, so as to stop the spool in the position of the angle $\theta_{EXPOSED}$.

In this construction, the spool drive shaft 34 is rotated even when no cassette CFL is loaded. After rotation of the spool drive shaft 34, the projection 34a is inevitably directed at the angle $\theta_{EXPOSED}$. When next cassette CFL is loaded, the opener mechanism opens the cassette shutter 106 to set the spool 100 rotatable. The spool drive shaft 34 is fitted on the spool 100 to rotate the data disk DD in the reverse direction for reading of the data disk DD. Consequently the present invention is effective in avoiding damaging a photo film cassette CFL.

The camera 2 includes the SCC switch for detecting open/closed states of the lid 30 and the SCT switch 40 for detecting existence of the cassette CFL, so as to recognize a using manner of a user. It is possible in the present invention that an exposure can be taken only when the using manner is acceptable. The LCD panel 22 indicates an error in an user's operation to inform him or her of it immediately.

If a user opens or closes the lid 30 without loading a cassette CFL, the lack of the cassette is detected according to the output of to the output of the SCT switch, so as not to effect the DEP_DD routine. The spool drive shaft 34 is stopped in the position $\theta_{EXPOSED}$. A normal cassette CFL is inserted next. Before reverse rotation of the spool for the DEP_DD routine, the opener mechanism opens the cassette shutter 106 to set the spool 100 rotatable. The spool drive shaft 34 is fitted on the spool 100 to rotate the data disk DD in the reverse direction. This being so, it is possible to avoid damaging a photo film cassette.

Presence and absence of the cassette CFL are indicated by turning on and off the cassette indicia CM in the LCD panel 22. This is convenient in the use of the camera.

The states of the SCC switch and the SCT switch 40 can be monitored by the programmed control of CPU 56, so as to simplify the camera structurally.

It is also advantageous in the present invention to operate the opener mechanism and the spool drive shaft 34 as depicted in FIGS. 9A–9C in the course of inserting the cassette CFL into the cassette containing chamber 32. The spool drive shaft 34 set at the angle $\theta_{EXPOSED}$ before use of the camera is simply rotated as an initial step. The cassette shutter 106 is opened while the spool drive shaft 34 is rotated. The spool drive shaft 34 becomes connected to the spool 100 having the angle $\theta_{UNEXPOSED}$ either when or after the cassette shutter 106 is opened. In conclusion, the shutter 106 becomes open before the start of rotating the spool 100. The leader of the photo film FLM is allowed to move away from the roll and toward the cassette shutter 106 only after the cassette shutter 106 opens fully inside the photo film passage port OP. This is advantageous in avoiding jamming the leader of the photo film FLM inside the photo film passage port OP, typically in the IX240 type of which the leader is advanced to the outside by rotation of the spool 100.

In the operation of FIGS. 9A–9C, the spool drive shaft 34 is rotated in the direction to wind back the photo film while the cassette shutter 106 rotates from the closed position to the open position, and until the spool drive shaft 34 becomes connected to the spool 100. The motor 46 is rotated in reverse. The present invention is applicable to a construction in which the spool drive shaft 34 is rotated in the direction to unwind the photo film while the cassette shutter 106 rotates from the closed position to the open position, and until the spool drive shaft 34 becomes connected to the spool 100. The motor 46 is rotated forwards.

In the DEP_DD routine above, the motor 46 is rotated in reverse, namely rotated in the direction to wind back the photo film. The present invention is applicable to a construction in which the motor 46 is rotated in the forward direction, namely the photo film unwinding direction, in the DEP_DD routine reading the bar code.

It is to be noted additionally that, when the used cassette CFL' of which the spool 100 has the position of $\theta_{EXPOSED}$ is inserted, the camera 2 detects the used cassette CFL' upon detection of the quiet zone 66 at the bar code reader 38. Then the used cassette CFL' is removable while the Release routine of S180 is inhibited.

In the above embodiment, the spool drive shaft 34 is stopped to set the spool 11 at the angle $\theta_{EXPOSED}$ when the type determiner section 84 of CPU 56 detects lack of the cassette CFL or existence of a cassette different from the predetermined type IX240. The present invention is applicable to a construction in which the spool drive shaft 34 is stopped to set the spool 11 at the angle $\theta_{EXPOSED}$ when the type determiner section 84 of CPU 56 detects that the rotary bar code on the data disk DD is defective and improperly read, or that the bar code reader 38 reads any improper information distinct from the existence of the predetermined type IX240 of the cassette CFL.

In the above embodiment, the spool drive shaft 34 is stopped to set the spool 11 at the angle $\theta_{EXPOSED}$. The present invention is applicable to a construction in which the spool drive shaft 34 is stopped to set the spool 11 at any predetermined angle different from the angle $\theta_{UNEXPOSED}$.

In the above embodiment, the predetermined type of the cassette CFL is the IX240 type. The present invention is applicable to any predetermined type of photo film cassette. Also, the predetermined type of photo film cassette may be a category including the IX240 type and certain types different from the IX240 type.

It is to be noted that, in FIGS. 4B and 6, the "x" indicia hole 126 and the circular ("o") indicia hole 128 are depicted in positions of a straight angle or 180°, but are actually arranged positions of 157°, which is equal to $\theta_{UNEXPOSED} - \theta_{EXPOSED}$ according to which the spool 100 is rotated. The circular ("o") indicia hole 128 is actually located nearer to the cassette shutter 106 than depicted, and is not directly above the spool 100 and the "x" indicia hole 126.

A set of externally operable buttons inside the button cover 28 are described hereinafter in detail with reference to FIGS. 20–34. Those buttons are associated with various switches to input commands. Elements similar to those in the above description are referred to with identical reference numerals.

Figure 20:
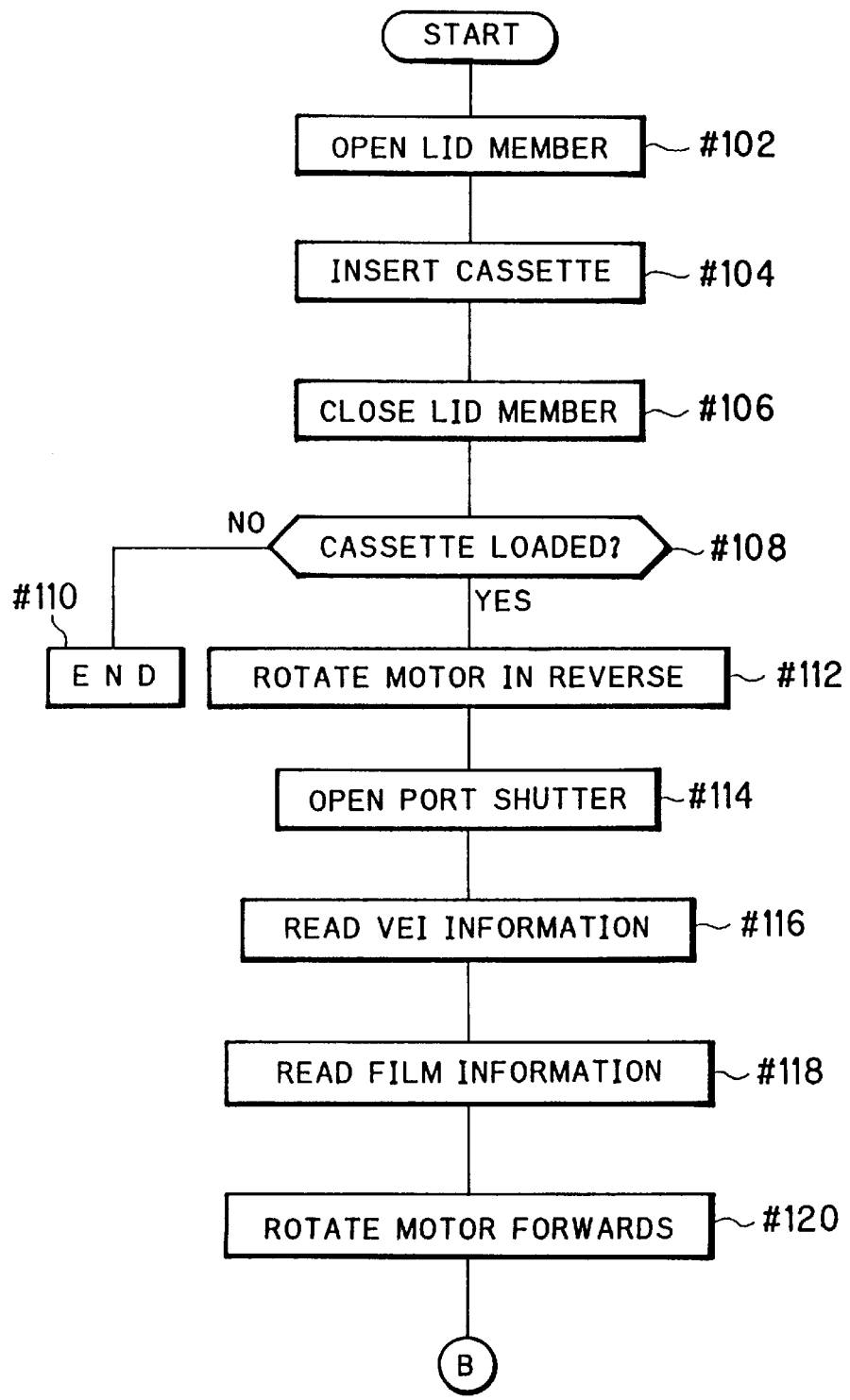
FIGS. 20 and 21 are flow charts illustrating the main routine of operation of the camera.
Figure 21:
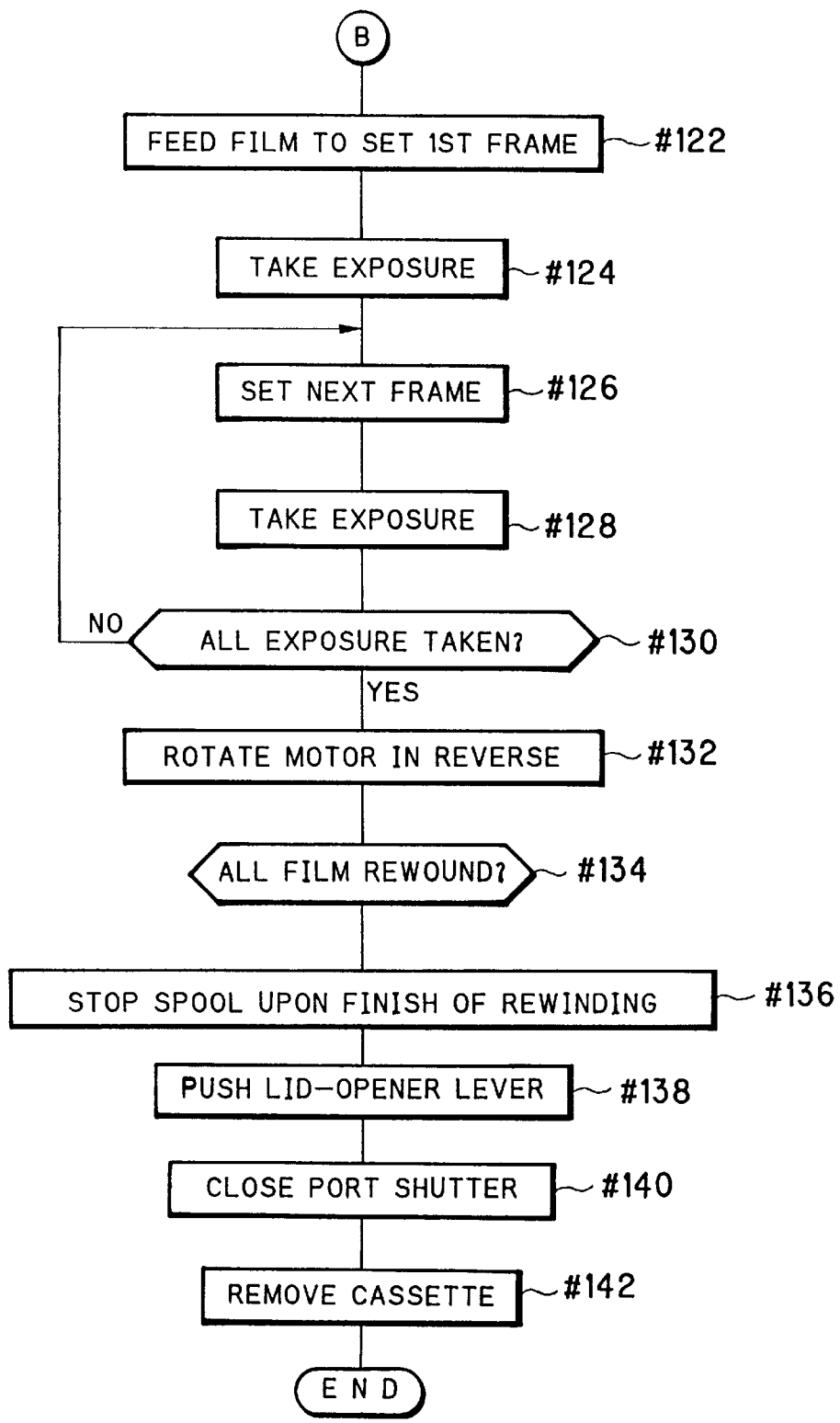

At #102 in the flow of FIG. 20, a user opens the lid 30 of FIG. 2A. At #104, the cassette CFL is inserted in the cassette containing chamber 32. At #106, the lid 30 is closed. In the camera, the SCC switch is disposed to be turned on/off by movement of a retainer lever for retaining the lid 30, and detects opening/closing movement of the lid 30. The SCT switch 40 is moved by the top end of the cassette CFL, to detect insertion of the cassette CFL. At #108, the camera evaluates whether the cassette CFL is loaded.

If it is detected at #108 that no cassette CFL is loaded, then the camera comes to stand by at #110, without further steps of the routine. If it is detected at #108 that the cassette CFL is loaded, then at #112 the motor 46 of the photo film feeding mechanism 204 (See FIG. 34) is rotated in reverse. The bar code reader 38 is rotated in reverse. The shutter rotating shaft 36 is rotated to open the cassette shutter 106 of FIGS. 5 and 6 at #114.

As the data disk DD rotates with the spool 100, the bar code reader 38 reads the bar code on the data disk DD. The initial rotational position of the data disk DD is previously stored with reference to the position of the bar code reader 38 and for each of the used status of the photo film, including the unexposed and exposed status. At #116, VEI information (visual exposure index information) read first. Note that the VEI information herein consists of an initial cassette status directly prior to rotating the data disk DD. A transition number, which is the number of changes between black bars and voids according to the output of the bar code reader 38, is monitored. The transition number after the start of the data disk DD and before first detection of the quiet zone 66 is obtained so as to recognize the initial cassette status, for the purpose of detecting the used status of the cassette CFL. After #116, the photo film information is read at #118 from the bar code on the data disk DD, including the photo film type. The steps of #116 and #118 constitutes the DEP_DD routine.

After reading the photo film information, the motor 46 of the photo film feeding mechanism 204 is rotated forwards at #120. The photo film starts being fed, and advanced out of the cassette shell while the cassette shutter 106 is open. At #122 of FIG. 21, the photo film FLM is fed to set the first frame 152. This frame setting operation is referred to as the FFS routine.

Then photographs are taken in an ordinary manner. At #124, the user operates the release switch to take an exposure. Then the spool drive shaft 34 rotates to set next frame 152 at #126. At #128, another exposure is taken.

Those steps of #126 and #128 are repeated until all exposures are taken on the photo film FLM. When it is detected at #130 that all exposures are taken, then at #132 the motor 46 of the photo film feeding mechanism 204 is rotated in reverse, to wind back the photo film into the cassette CFL. When it is detected at #134 that all the photo film FLM is rewound, the step of the rewinding is ended. At #136, the spool 100 is stopped in the predetermined angular upon finish of the rewinding. The indicator tongue 116 is stopped at the "x" indicia hole 126, to indicate the status of a used cassette CFL'. When the user pushes the lid-opener button 44 at #138 to open the lid 30, the shutter rotating shaft 36 rotates with the lid-opener button 44, to close the cassette shutter 106 at #140. At #142, the used cassette CFL' is unloaded from the cassette containing chamber 32.

In the camera, the photo film information read from the data disk DD is displayed in the LCD panel 22 in the following manner.

Figure 22:
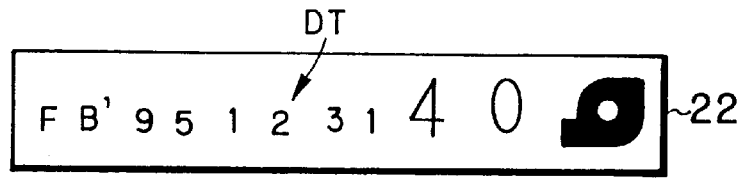
FIG. 22 is an explanatory view illustrating the liquid crystal display panel displaying a date in a Date display mode.
Figure 23A:
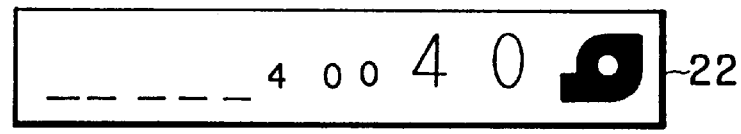
FIGS. 23A–23D are explanatory views illustrating a mode in which the liquid crystal display panel displays photo film information.
Figure 23B:
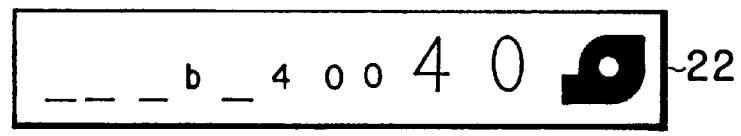
Figure 23C:
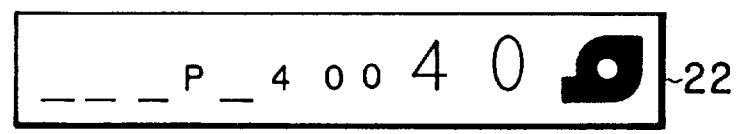
Figure 23D:
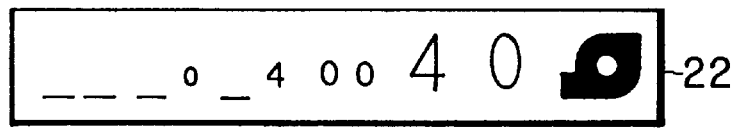

After ending the DEP_DD routine and the FFS routine for the cassette CFL being loaded, the LCD panel 22 indicates the date, the available frame number and the like as illustrated in FIG. 22. The date is determined according to an output of the clock 86. "9 5 1 2 3 1" means the 31st day of December, 1995. "40" means the available frame number. "F" and "B" are signs for printing status of the indicated date. "F" means the front printing, and "B" means the back printing. In the example of FIG. 22, the day, month and year in the LCD panel 22 are printed on front and back surfaces. The cassette indicia CM appears in this example, and indicates that the cassette CFL is loaded in the cassette containing chamber 32.

When the shutter release button 14 (See FIG. 1) is depressed only halfway, the display control section 80 operates so that the ISO speed and the photo film type are displayed in the LCD panel 22 instead of the date on the condition of standing by for an exposure, as illustrated in FIGS. 23A–23D. In the digit next to the number 400 as ISO speed (the digit 23b of FIG. 2B), there appear "P" for a reversal film, "b", for a monochromatic film, nothing for a color negative film, and "o" for any other type of photo film. When the shutter release button 14 is fully depressed, responsively the date similar to that in FIG. 22 is displayed in the LCD panel 22 instead of the photo film information. The frame number is now 39 instead of 40.

The combinations of depressions of the buttons for changes of the modes and adjustment are as follows.

Figure 24:
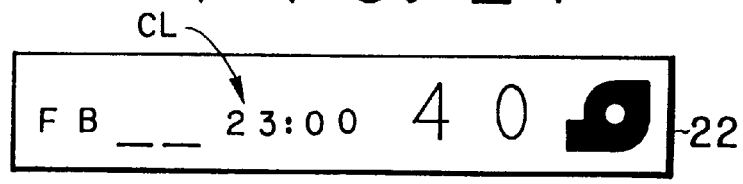
FIG. 24 is an explanatory view illustrating the liquid crystal display panel displaying a time in a Date display mode.
Figure 25:
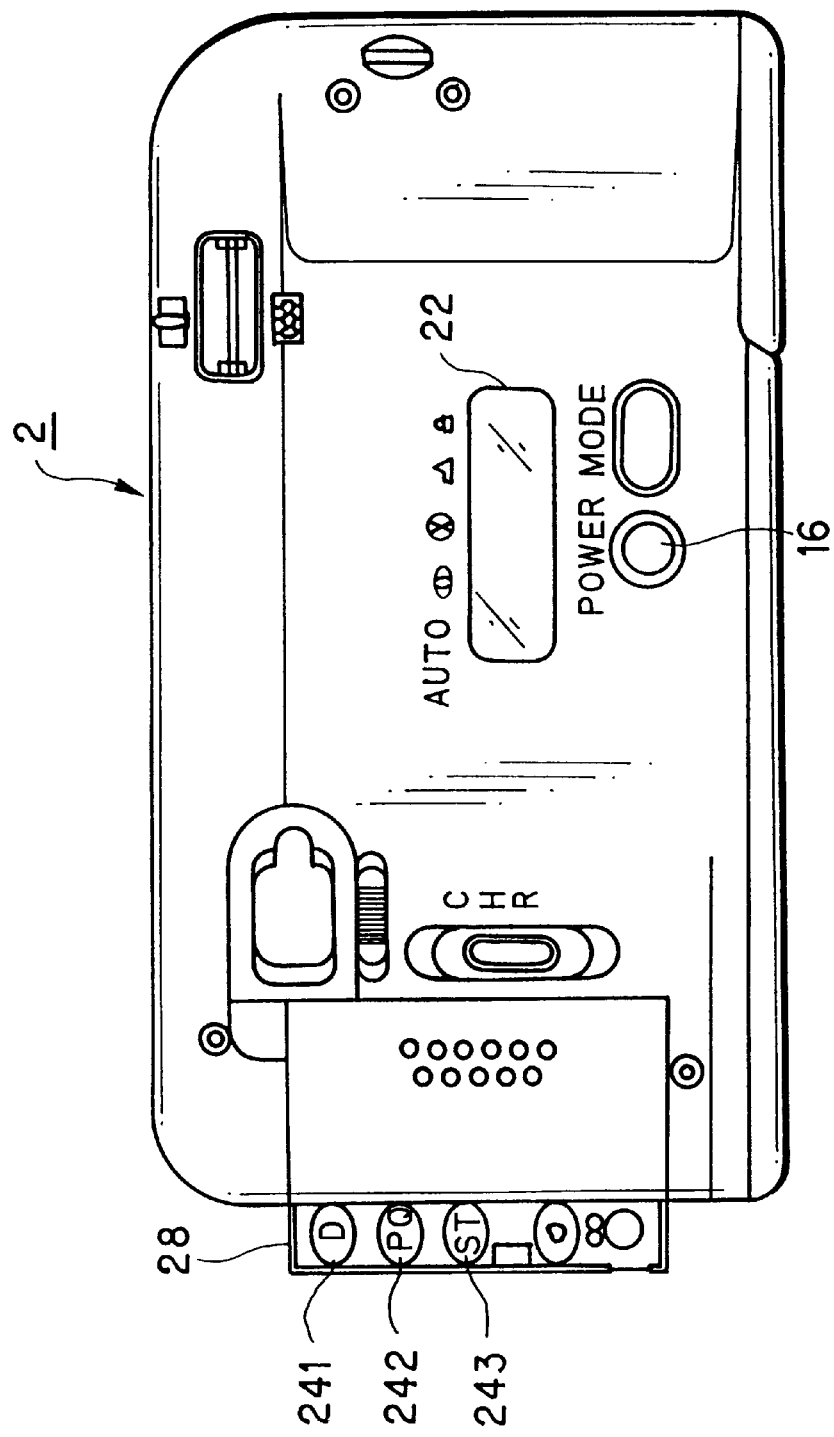
FIG. 25 is a rear elevation illustrating the camera in which a D button, a PQ button and an ST button appear.

When the button cover 28 in FIG. 2A is opened horizontally tally, a D button 241, a PQ button 242 and an ST button 243 appears as illustrated in FIG. 25. To change the date, the D button 241 is pushed. Each time the D button 241 is pushed, the date being displayed is changed successively as illustrated in FIG. 26. When the date is turned off, the display returns to its initial state of the date, and repeats the successive changes. In FIG. 26, 'Y-Y represents a two-digit position of a year value, M—M a position of a month value, D—D a position of a day value, H—H a position of an hour value and N—N a position of a minute value. In FIG. 24, the LCD panel 22 indicates the time, the available frame number and the like without the day, month or year.

Figure 27:
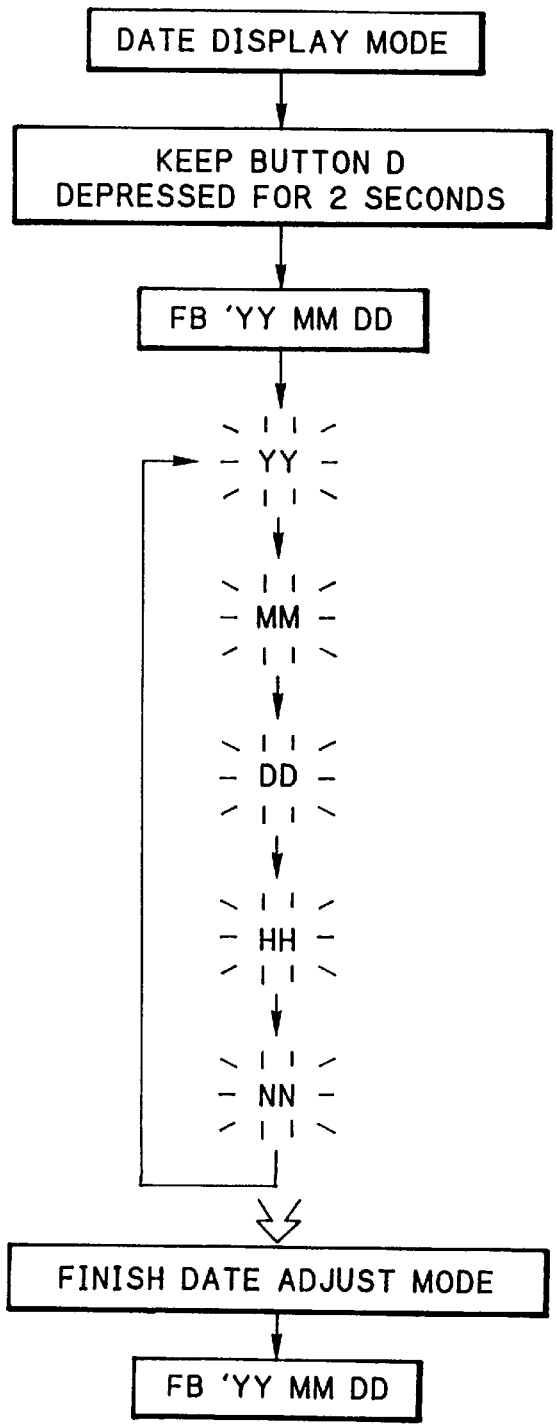
FIG. 27 is a chart illustrating a routine where a Date adjust mode is started and ended.

In the flow of FIG. 27, the D button 241 is kept pushed for two seconds. Then a Date display mode is changed to a Date adjust mode. The LCD panel 22 indicates in an initialized status. At first the digits for the "year", which are indicated by Y—Y in FIG. 27, are caused to blink at a frequency of 2 Hz. Similarly the remaining digits will be caused to blink at the frequency of 2 Hz. Each time the ST button 243 is pushed, the year value is stepped up from n to n+1. If the ST button 243 is kept pushed for one second, the year value is stepped up one by one consecutively at a frequency of 125 msec. When a desired value appears, the PQ button 242 is pushed to cause the digits for the "month" to blink, which are indicated by M—M. In short, the PQ button 242 consists of a switch for locally designating a two-digit region in the Date adjust mode. The ST button 243 consists of a switch for adjusting a digit in the Date adjust mode.

Accordingly the month, day, hour and minute are adjusted by pushing the D button 241, the PQ button 242 and the ST button 243. After finishing adjustment of the date, the D button 241 is pushed to end the Date adjust mode to return the LCD panel 22 to the Date display mode of FIG. 22.

The present camera is capable of writing information to the magnetic recording layer 72 and in the magnetic recording area 151 (See FIGS. 8 and 8A), regarding printing operation, including the number of prints to be produced from each frame. The information writing is hereinafter described.

To determine the number PQ of prints to be produced, a PQ number mode is used, which is now described with reference to FIG. 28. When the PQ button 242 is pushed in the Date display mode, the LCD panel 22 is changed from the date to the print number. When the print number is indicated as illustrated in FIG. 28, nothing appears in three uppermost digits of the date. A sign "P" is indicated in the fourth uppermost digit. The PQ number is indicated in at least one of the two lowest digits. Immediately after the PQ number mode is started, the PQ number is "1" as an initial value. Each time the PQ button 242 is pushed, the PQ number is incrementally stepped as 2, 3, 4 and so on. After the PQ number becomes up to 10, it becomes zero (0) and again 1. The PQ number is changed cyclically. When the PQ number is zero, it means that no print is produced from the frame with that information. After the PQ number is determined as intended by the user, he takes an exposure by turning on the SP1 switch of the shutter release button 14. Then the photo film FLM is moved by the pitch of one frame, while the magnetic information writer 150 of FIG. 8 writes the print number to the magnetic recording area 151 together with information of the date on which the exposure is taken. After the one-frame feeding, the PQ number mode is ended to return to the Date display mode automatically. The PQ number in the camera is set again as 1.

When an exposure is taken in the PQ number mode, printing information is written to the magnetic recording area 151. The printing information includes the photographing date, letters or signs designated for printing, and the PQ number. In the camera, the printing information regarding a preceding frame is written to the EEPROM 54 in FIG. 34.

In FIG. 34, a reference numeral 202 designates the switch group including the various switches. The flash device inside the flash device 10 includes a flash circuit 208 and a flash control circuit 210. CPU 56 sends the flash device 10 a charge start signal, and receives a charge finish signal from the flash device 10 upon the finish of charging. In the flash device 10, the flash control circuit 210 receives a flash start signal from CPU 56, and drives the flash circuit 208 to emit flash. When the flash control circuit 210 receives a flash finish signal from CPU 56, the flash circuit 208 is stopped from emitting flash. CPU 56 sends a power supply 212 a drive signal when a user's finger depresses a flash charge button. The power supply 212 supplies power to the flash control circuit 210, and to the depression detector 214. A depression detector 214 sends the LED 12 a depression detecting signal. CPU 56 sends the LED 12 a rangefinding finish signal and a self-photography mode signal. A reference numeral 6A designates an autofocussing device, and 6B a photometry device for auto exposure control. A reference numeral 216 designates a reset circuit, 218 a regulator, and 220 a BC circuit.

Figure 29:
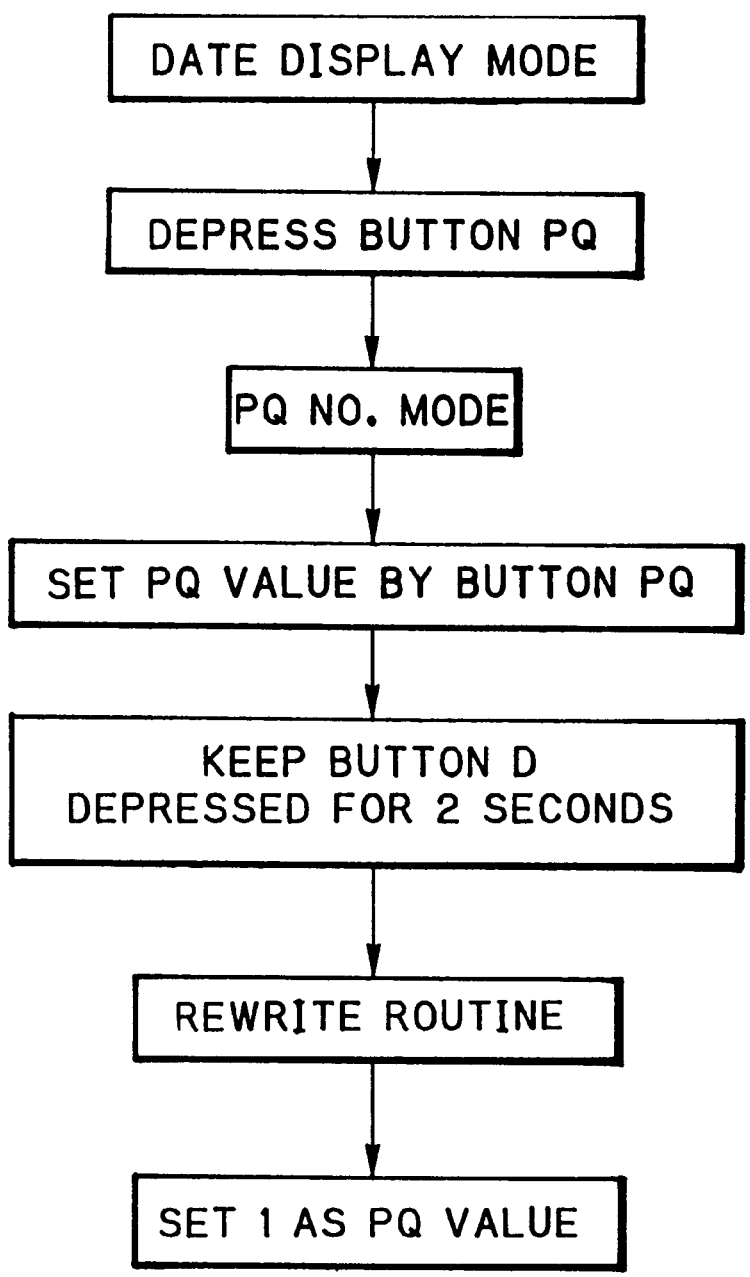
FIG. 29 is a flow chart illustrating a routine for executing a Rewriting operation.

The PQ number written to the magnetic recording area 151 is changeable if no frame has been exposed after the frame associated with the PQ number. A new PQ number can be additionally written to the magnetic recording area 151 if no frame has been exposed after the frame associated with the initial PQ number. The consecutive operation of the camera for a Rewriting operation is depicted in FIG. 29. When the PQ button 242 in the Date display mode is pushed, the PQ number mode is started. A PQ number is set by pushing the PQ button 242 as desired. Then the D button 241 is kept pushed for two seconds, so that the Rewriting operation is started. The motor 46 of the photo film feeding mechanism 204 is rotated in reverse to move the photo film FLM back by one frame. During this back movement, the magnetic information writer 150 magnetically deletes the information initially written to the magnetic recording area 151.

When the photo film FLM is fed to a position of the frame preceding to the newest frame, the feeding motor is changed in the rotating direction to restart the forward movement. The printing information, including the photographing date, the letters or signs designated for printing, and a newly determined PQ number, is read from EEPROM 54, and written to the magnetic recording area 151. If a caption has been already selected, the code of the selected caption is written. After the one-frame feeding, the PQ number mode is ended to return to the Date display mode automatically. The PQ number is set again to the initial value "1".

An ST select mode is described next, to be used for inserting a caption to a print produced from a frame. In the ST select mode, a message, a title or a caption is selectively designated from preset examples. When a frame is printed to produce a print, a selected caption is printed on the back of the print. The selection operation of the ST select mode is hereinafter described.

Figure 30:
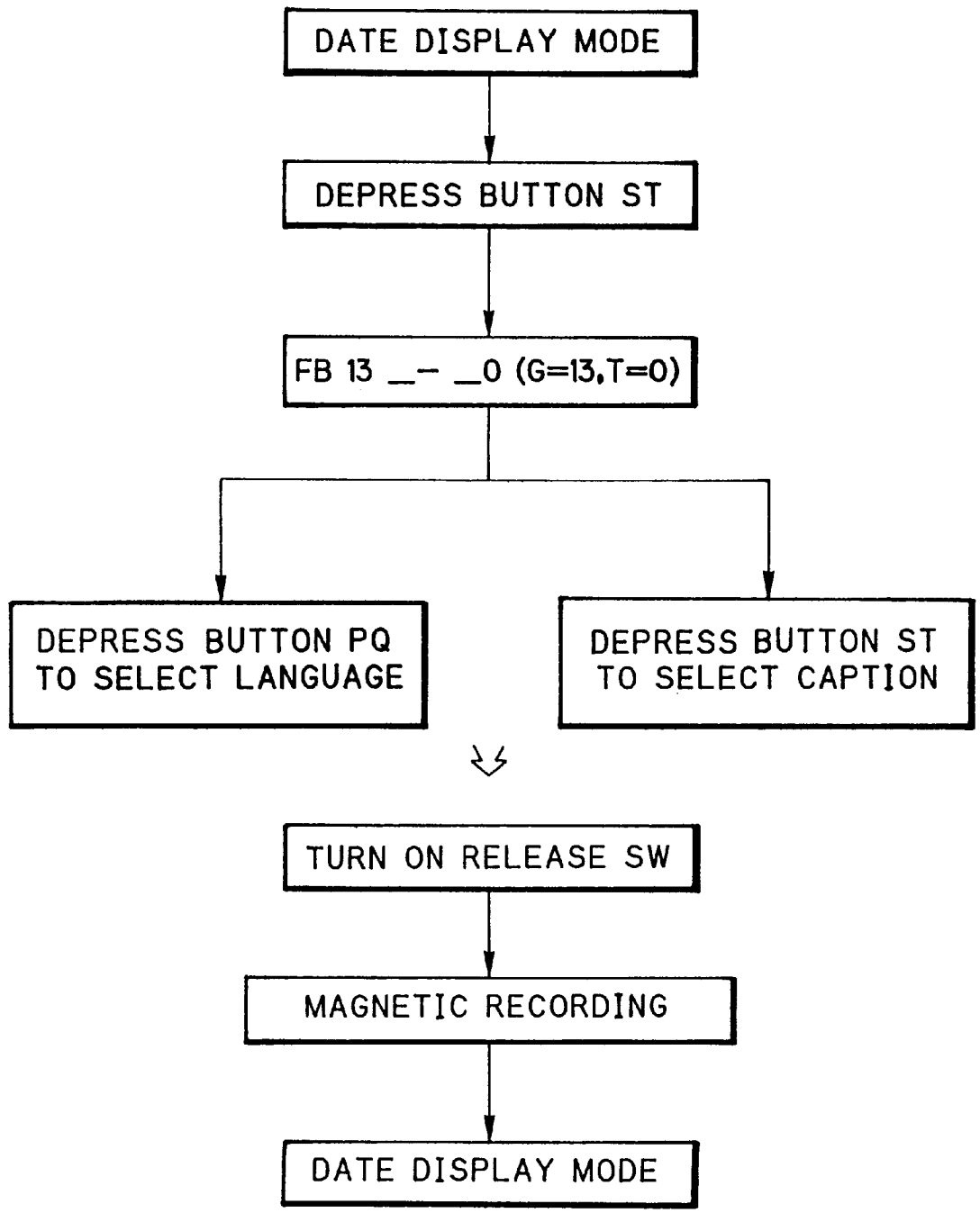
FIG. 30 is a chart illustrating a routine where an ST select mode is started and ended.

In the course of the Date display mode, the ST button 243 is pushed, to change the LCD panel 22 from the date to the caption setting (ST). For the caption setting (ST), TITLE LANGU data is read from EEPROM 54. In FIG. 30, the language code LANGU, such as "13", is indicated in the two uppermost digits of the date. Nothing appears in the third uppermost digit. A hyphen "-" is indicated in the fourth uppermost digit. The caption code TITLE is indicated in the two lowest digits. The TITLE LANGU data is partially illustrated in FIGS. 31 and 32, and consists of codes defined for the languages and captions. To command indication in the LCD panel 22, the codes are used. The caption setting (ST) is initially determined as the language code G=13 (U.S. English) and the caption code T=0 (CHRISTMAS) as illustrated in FIG. 30.

Each time the ST button 243 is pushed, the caption code is incrementally stepped as 1, 2, 3, 4 and so on. After the caption code becomes up to 30, it becomes "_", and again zero (0). When the caption code is "_", it means that no caption is printed with the frame. The caption code is changed cyclically. The ST button 243 is constructed such that, when kept pushed for one second, the caption code is incrementally stepped automatically at frequency of 125 msec. The language code, each time the PQ button 242 is pushed, is incrementally stepped as 1, 2, 3 and so on. After the language code becomes up to 13, it becomes 1 again. The language code is changed cyclically. In response to turning off the ST button 243, the caption code is written to EEPROM 54. In response to turning off the PQ button 242, the language code is written to EEPROM 54. When the ST select mode is started again in next operation, the caption code and the language code stored in EEPROM 54 are displayed.

After the caption code and the language code are set, the user takes an exposure by turning on the SP1 switch of the shutter release button 14 and driving a shutter device 14a via the shutter release button 14. The photo film is moved by the pitch of one frame, while the magnetic information writer 150 writes the codes to the magnetic recording area 151 together with information of the date on which the exposure is taken. After the one-frame feeding, the ST select mode is ended to return to the Date display mode automatically.

Figure 33:
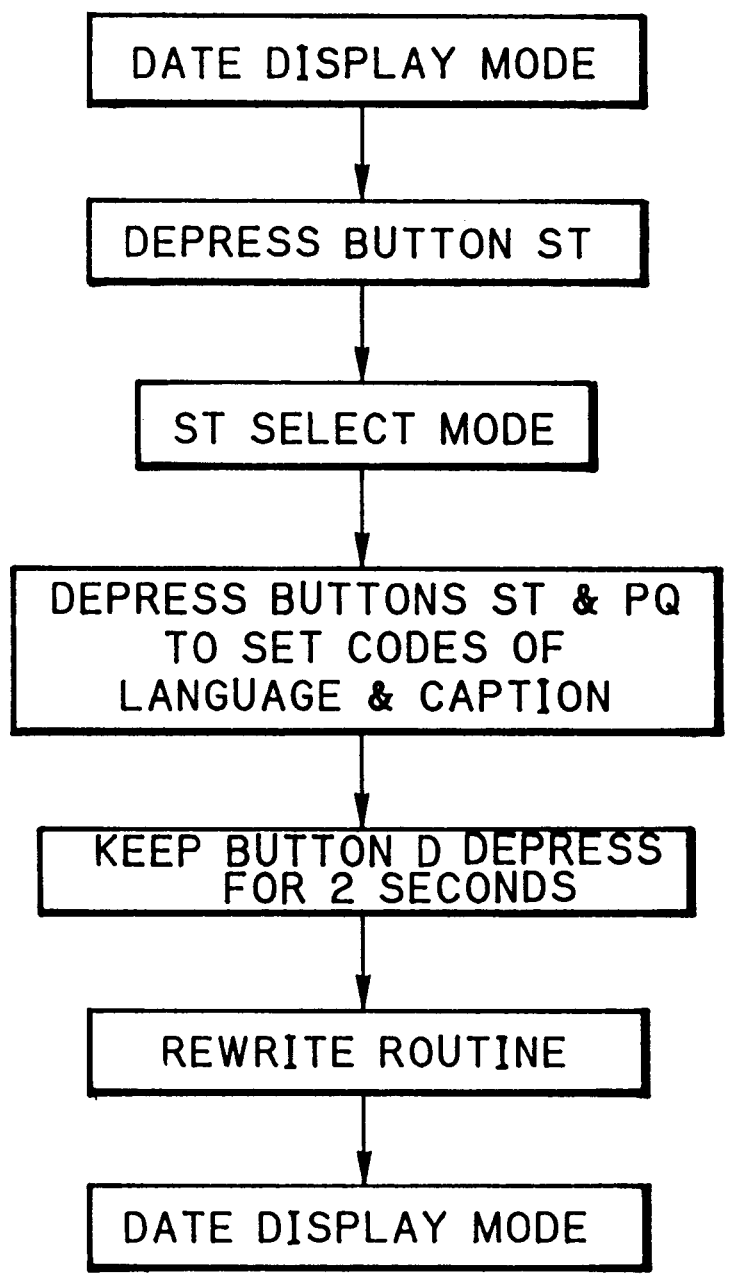
FIG. 33 is a flow chart illustrating a routine for a Rewriting operation of a language and/or a caption.

In a manner similar to the PQ number, the caption code and language code written to the magnetic recording area 151 are changeable if no frame has been exposed after the frame associated with the caption code and language code. A new caption code and a language code can be additionally written to the magnetic recording area 151 if no frame has been exposed after the frame associated with the initial caption code and language code. The consecutive operation of the camera for a Rewriting operation is depicted in FIG. 33. When the ST button 243 in the Date display mode is pushed, the ST select mode is started. A caption code and a language code are set by pushing the ST button 243 and the PQ button 242 as desired. Then the D button 241 is kept pushed for two seconds, so that the Rewriting operation is started in a manner similar to the above. If the PQ number has been determined, the determined value is written. If the caption code "_" (off) has been written to the magnetic recording area 151, the caption code being stored is magnetically deleted.

In the PQ number mode, the D button 241 is kept pushed for two seconds for starting the Rewriting operation. The present invention is applicable to an alternative structure in which the Rewriting operation is started when the ST button 243 is kept pushed for two seconds.

In the above embodiments, as illustrated in FIG. 28, the information of the PQ number is written to the magnetic recording area 151 only while the PQ number mode is executed. When the PQ number mode is not executed, no information of a PQ number is written to the magnetic recording area 151. Alternatively it is possible in the present invention that, when the PQ number mode is not executed in exposing the frame 152, a PQ number of "1" is automatically written to the magnetic recording area 151 associated with the frame 152.

Furthermore it is possible that, when the PQ number mode is not executed in exposing the frame 152, a PQ number determined the most previously for an exposure is automatically written to the magnetic recording area 151 associated with the frame 152.

In the above embodiment, exposures are taken on the photo film FLM in the course of unwinding from the cassette CFL. The present invention is applicable to a camera in which the photo film FLM is pre-drawn from the cassette CFL, and exposures are taken in the course of winding back into the cassette CFL.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A camera having a magnetic head, said magnetic head recording information of a printing number of photographic prints to a magnetic layer of photo film in association with a frame exposed on said photo film, said camera comprising:

an externally observable display device;

a first input unit externally operable for generating a first signal;

a second input unit externally operable for generating a second signal;

a third input unit externally operable for generating a third signal; and controller means for selectively executing a date display mode, a date adjust mode and a print number mode, said date display mode being adapted to indicate a date in said display device, said date adjust mode being adapted to adjusting said date in said display device, and said print number mode being adapted to indicate said printing number, said date adjust mode being selected when said first signal is generated in said date display mode, and said print number mode being selected when either of said second and third signals is generated in said date display mode.

2. A camera as defined in claim 1, wherein when said second signal is generated in said date adjust mode, said controller means locally designates one of plural numerals arranged in said display device to be adjusted; and when said third signal is generated, said controller means changes said locally designated one of said numerals.

3. A camera as defined in claim 2, wherein when said either signal of said second and third signals is generated in said print number mode, said controller means changes said printing number.

4. A camera as defined in claim 3, further comprising photo film feeding means for moving said photo film in forward and reverse directions, said forward direction being adapted to direct an unexposed frame of said photo film toward an exposure station, said reverse direction being adapted to direct an exposed frame of said photo film toward said exposure station;

wherein said photo film feeding means moves said photo film in said forward direction by one frame after taking an exposure, and said magnetic head records said printing number while said photo film is moved in said forward direction by one frame.

5. A camera as defined in claim 4, wherein said controller means effects a rewriting operation when a selected signal selected from said first signal and a remaining one of said second and third signals is generated in said print number mode;

in said rewriting operation, said photo film feeding means moves said photo film in said reverse direction by one frame to set a prior frame at said exposure station, and then moves said photo film in said forward direction, and said magnetic head records said printing number for said prior frame while said photo film is moved in said forward direction.

6. A camera as defined in claim 5, wherein said first, second and third input units are first, second and third pushbuttons, and said rewriting operation is effected upon continuous depression of one of said pushbuttons for a predetermined time for said selected signal being selected from said first signal and said remaining one of said second and third signals.

7. A camera as defined in claim 6, wherein said display device comprises a first digital region for indicating a year value of said date, a second digital region for indicating a month value of said date, a third digital region for indicating a day value of said date.

8. A camera as defined in claim 7, wherein in said print number mode, a selected one of said first, second and third digital regions indicates an indicia for representing said print number mode, and another selected one of said first, second and third digital regions indicates said printing number.

* * * * *